United States Patent
Ishikawa et al.

(10) Patent No.: US 12,254,772 B2
(45) Date of Patent: Mar. 18, 2025

(54) SIGNAL PROCESSING DEVICE, SIGNAL PROCESSING METHOD, AND MOBILE DEVICE

(71) Applicant: SONY GROUP CORPORATION, Tokyo (JP)

(72) Inventors: Tatsuya Ishikawa, Tokyo (JP); Chao Wang, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 9 days.

(21) Appl. No.: 17/753,828

(22) PCT Filed: Sep. 11, 2020

(86) PCT No.: PCT/JP2020/034437
§ 371 (c)(1),
(2) Date: Mar. 16, 2022

(87) PCT Pub. No.: WO2021/060018
PCT Pub. Date: Apr. 1, 2021

(65) Prior Publication Data
US 2022/0383749 A1 Dec. 1, 2022

(30) Foreign Application Priority Data

Sep. 25, 2019 (JP) ................. 2019-174077

(51) Int. Cl.
*G01S 13/00* (2006.01)
*G01S 13/89* (2006.01)
(Continued)

(52) U.S. Cl.
CPC .............. *G08G 1/165* (2013.01); *G01S 13/89* (2013.01); *G08G 1/137* (2013.01)

(58) Field of Classification Search
CPC ........ G08G 1/165; G08G 1/137; G08G 1/166; G01S 13/89; G01S 7/4802; G01S 13/931;
(Continued)

(56) References Cited

U.S. PATENT DOCUMENTS

2018/0203445 A1* 7/2018 Micks ..................... G06F 30/15
2020/0225673 A1* 7/2020 Ebrahimi Afrouzi .... G06N 5/04
(Continued)

FOREIGN PATENT DOCUMENTS

| CN | 105511485 A | 4/2016 |
|---|---|---|
| CN | 105868687 A | 8/2016 |

(Continued)

OTHER PUBLICATIONS

Machine translation WO-2018091386 (year: 2018).*
(Continued)

*Primary Examiner* — Anne Marie Antonucci
*Assistant Examiner* — Jordan T Smith
(74) *Attorney, Agent, or Firm* — CHIP LAW GROUP

(57) ABSTRACT

The present technology relates to a signal processing device, a signal processing method, a program, and a mobile device enabling to obtain an occupancy grid map in which an appropriate path can be set.
The signal processing device includes: a map creation unit configured to create an occupancy grid map indicating a presence or absence of an object in a unit of a grid on the basis of first sensor data from a first sensor used to detect the object in surroundings of a mobile device; an attribute setting unit configured to set an attribute of the grid of the occupancy grid map on the basis of an attribute of the object; and a correction unit configured to correct the occupancy grid map on the basis of an attribute of the grid. The present technology can be applied to, for example, a system that controls automatic driving.

18 Claims, 14 Drawing Sheets

(51) Int. Cl.
*G08G 1/137* (2006.01)
*G08G 1/16* (2006.01)

(58) Field of Classification Search
CPC ....... G01S 17/89; G01S 17/931; G06V 20/56; G06V 20/70; B60W 2554/20; B60W 2554/40
See application file for complete search history.

(56) References Cited

U.S. PATENT DOCUMENTS

| | | | | |
|---|---|---|---|---|
| 2021/0403015 | A1* | 12/2021 | Kato | B60W 50/06 |
| 2022/0057232 | A1* | 2/2022 | Shen | G01S 17/89 |

FOREIGN PATENT DOCUMENTS

| | | | | |
|---|---|---|---|---|
| CN | 107480638 | A * | 12/2017 | ......... G06K 9/00805 |
| CN | 108775902 | A | 11/2018 | |
| EP | 2333578 | A2 | 6/2011 | |
| JP | 2012-238151 | A | 12/2012 | |
| JP | 2019016308 | A | 1/2019 | |
| JP | 2019046147 | A * | 3/2019 | |
| WO | WO-2018091386 | A1 * | 5/2018 | |

OTHER PUBLICATIONS

Machine Translation JP-2019046147 (year: 2019).*
Machine Translation CN-107480638 (Year: 2017).*
International Search Report and Written Opinion of PCT Application No. PCT/JP2020/034437, issued on Nov. 17, 2020, 09 pages of ISRWO.

* cited by examiner

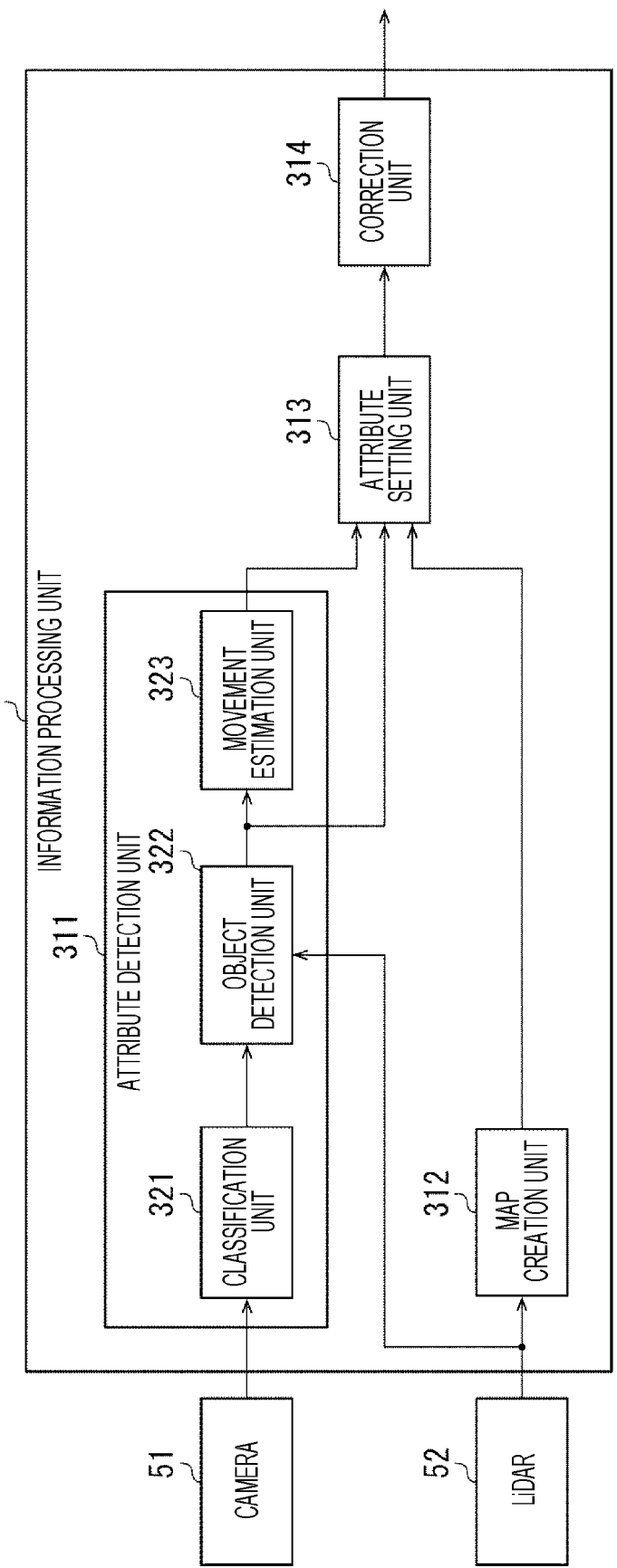

FIG. 9

| MOBILE OBJECT | EXPANSION AMOUNT (WITH TRACKING) | EXPANSION AMOUNT (WITHOUT TRACKING) |
|---|---|---|
| PEDESTRIAN | TRAVELING DIRECTION: LARGE<br>LEFT-RIGHT DIRECTION: NORMAL | SIMILAR IN ENTIRE PERIPHERY |
| BICYCLE | TRAVELING DIRECTION: LARGE<br>LEFT-RIGHT DIRECTION: SMALL | (IN CASE WHERE DIRECTION CAN BE DETECTED) FRONT: LARGE<br>(IN CASE WHERE DIRECTION CANNOT BE DETECTED) SIMILAR IN ENTIRE PERIPHERY |
| MOTORCYCLE | TRAVELING DIRECTION: LARGE<br>LEFT-RIGHT DIRECTION: SMALL | (IN CASE WHERE DIRECTION CAN BE DETECTED) FRONT: LARGE<br>(IN CASE WHERE DIRECTION CANNOT BE DETECTED) SIMILAR IN ENTIRE PERIPHERY |
| AUTOMOBILE | TRAVELING DIRECTION: LARGE<br>LEFT-RIGHT DIRECTION: SMALL | (IN CASE WHERE DIRECTION CAN BE DETECTED) FRONT: LARGE<br>(IN CASE WHERE DIRECTION CANNOT BE DETECTED) SIMILAR IN ENTIRE PERIPHERY |
| OFFICE ROBOT | TRAVELING DIRECTION: LARGE<br>LEFT-RIGHT DIRECTION: NORMAL | (IN CASE WHERE DIRECTION CAN BE DETECTED) FRONT: LARGE<br>(IN CASE WHERE DIRECTION CANNOT BE DETECTED) SIMILAR IN ENTIRE PERIPHERY |
| DRONE | TRAVELING DIRECTION: LARGE<br>LEFT-RIGHT DIRECTION: NORMAL | SIMILAR IN ENTIRE PERIPHERY |
| FACTOR CONVEYANCE ROBOT | TRAVELING DIRECTION: LARGE<br>LEFT-RIGHT DIRECTION: SMALL | (IN CASE WHERE DIRECTION CAN BE DETECTED) FRONT: LARGE<br>(IN CASE WHERE DIRECTION CANNOT BE DETECTED) SIMILAR IN ENTIRE PERIPHERY |

SIGNAL PROCESSING DEVICE, SIGNAL PROCESSING METHOD, AND MOBILE DEVICE

CROSS REFERENCE TO RELATED APPLICATIONS

This application is a U.S. National Phase of International Patent Application No. PCT/JP2020/034437 filed on Sep. 11, 2020, which claims priority benefit of Japanese Patent Application No. JP 2019-174077 filed in the Japan Patent Office on Sep. 25, 2019. Each of the above-referenced applications is hereby incorporated herein by reference in its entirety.

TECHNICAL FIELD

The present technology relates to a signal processing device, a signal processing method, a program, and a mobile device, and in particular to a signal processing device, a signal processing method, a program, and a mobile device capable of obtaining an occupancy grid map in which an appropriate path can be set.

BACKGROUND ART

In recent years, a technique of setting a route for avoiding an obstacle by using an occupancy grid map created using light detection and ranging or laser imaging detection and ranging (LiDAR) has been developed (see, for example, Patent Document 1).

In the invention described in Patent Document 1, in a case where a grid of an occupancy grid map is included in a blind spot area, when obstacle reliability of the grid is a maximum value, the obstacle reliability is gradually attenuated to an intermediate value indicating that the presence of the obstacle is unknown. Furthermore, when the obstacle in the grid is a stationary object, a rate of attenuating the obstacle reliability is reduced.

CITATION LIST

Patent Document

Patent Document 1: Japanese Patent Application Laid-Open No. 2012-238151

SUMMARY OF THE INVENTION

Problems to be Solved by the Invention

However, in the invention described in Patent Document 1, only a case has been studied in which a grid is included in a blind spot area in a case where an obstacle is a stationary object. Therefore, for example, in a case where erroneous detection, detection omission, or the like of an obstacle occurs due to noise or the like, it is difficult to set an appropriate path on the basis of the occupancy grid map.

The present technology has been made in view of such a situation, and is to make it possible to obtain an occupancy grid map in which an appropriate path can be set.

Solutions to Problems

A signal processing device according to a first aspect of the present technology includes: a map creation unit configured to create an occupancy grid map indicating a presence or absence of an object in a unit of a grid on the basis of first sensor data from a first sensor used to detect the object in surroundings of a mobile device; an attribute setting unit configured to set an attribute of the grid of the occupancy grid map on the basis of an attribute of the object; and a correction unit configured to correct the occupancy grid map on the basis of an attribute of the grid.

A signal processing method according to the first aspect of the present technology includes: creating an occupancy grid map indicating a presence or absence of an object in a unit of a grid on the basis of sensor data from a sensor used to detect the object in surroundings of a mobile device; setting an attribute of the grid of the occupancy grid map on the basis of an attribute of the object; and correcting the occupancy grid map on the basis of an attribute of the grid.

A program according to the first aspect of the present technology causes a computer to execute processing of: creating an occupancy grid map indicating a presence or absence of an object in a unit of a grid on the basis of sensor data from a sensor used to detect the object in surroundings of a mobile device; setting an attribute of the grid of the occupancy grid map on the basis of an attribute of the object; and correcting the occupancy grid map on the basis of an attribute of the grid.

A mobile device according to a second aspect of the present technology includes: a map creation unit configured to create an occupancy grid map indicating a presence or absence of an object in a unit of a grid on the basis of sensor data from a sensor used to detect the object in surroundings; an attribute setting unit configured to set an attribute of the grid of the occupancy grid map on the basis of an attribute of the object; a correction unit configured to correct the occupancy grid map on the basis of an attribute of the grid; and an action planning unit configured to set a path on the basis of the corrected occupancy grid map.

In the first aspect of the present technology, the occupancy grid map indicating a presence or absence of the object in a unit of a grid is created on the basis of sensor data from the sensor used to detect the object in surroundings of the mobile device, an attribute of the grid of the occupancy grid map is set on the basis of an attribute of the object, and the occupancy grid map is corrected on the basis of an attribute of the grid.

In the second aspect of the present technology, the occupancy grid map indicating a presence or absence of the object in a unit of a grid is created on the basis of sensor data from the sensor used to detect the object in surroundings, an attribute of the grid of the occupancy grid map is set on the basis of an attribute of the object, the occupancy grid map is corrected on the basis of an attribute of the grid, and a path is set on the basis of the corrected occupancy grid map.

BRIEF DESCRIPTION OF DRAWINGS

FIG. 7 is a block diagram illustrating a configuration example of an information processing unit to which the present technology is applied.

FIG. 9 is a table illustrating an expansion amount for each type of a mobile object.

MODE FOR CARRYING OUT THE INVENTION

Hereinafter, an embodiment for implementing the present technology will be described. The description will be given in the following order.

1. Configuration example of vehicle control system
2. Problem of occupancy grid map
3. Embodiment
4. Modification
5. Other

1. CONFIGURATION EXAMPLE OF VEHICLE CONTROL SYSTEM

Figure 1:
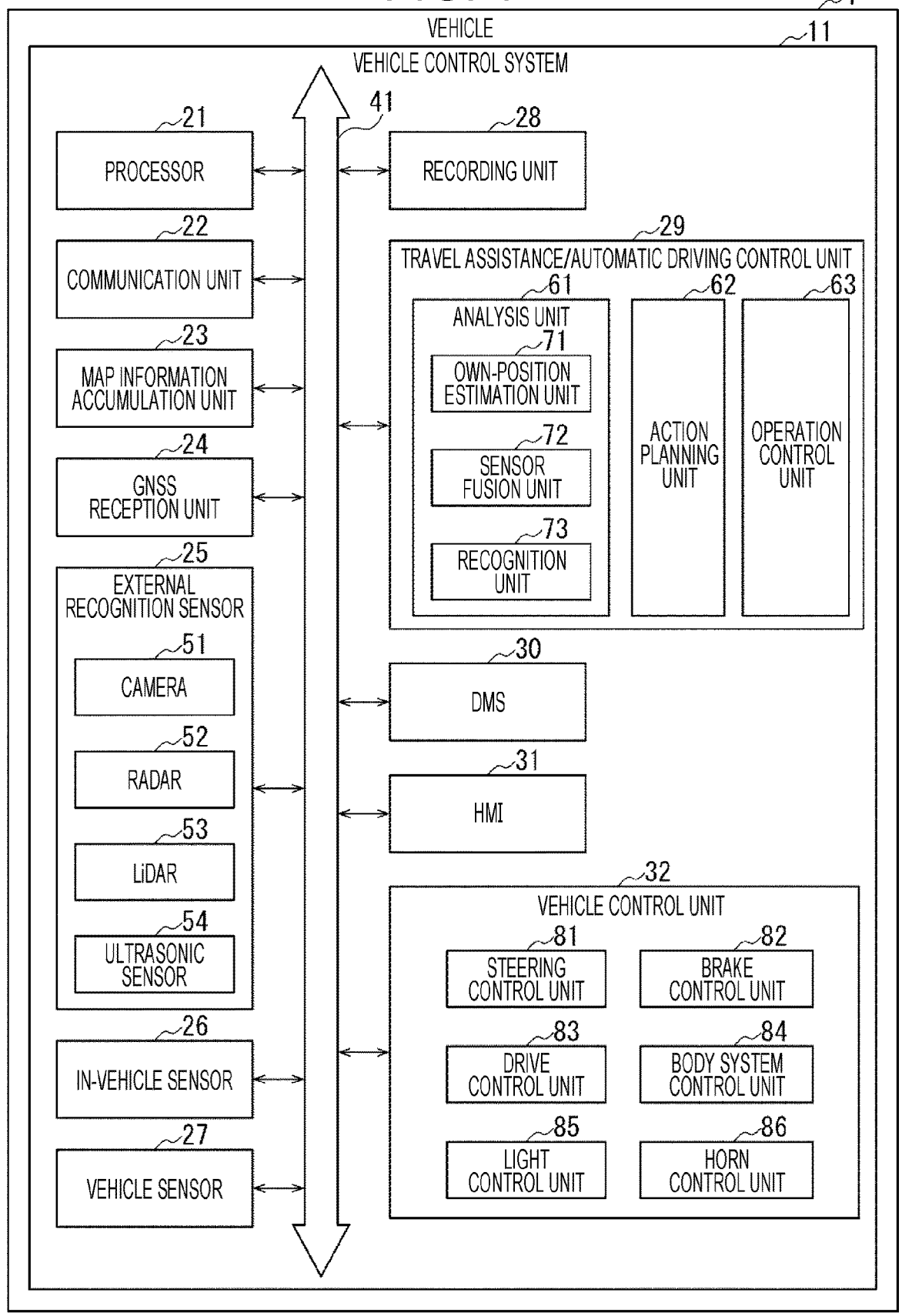
FIG. 1 is a block diagram illustrating a configuration example of a vehicle control system.

FIG. 1 is a block diagram illustrating a configuration example of a vehicle control system 11, which is an example of a mobile device control system to which the present technology is applied.

The vehicle control system 11 is provided in a vehicle 1 and performs processing related to travel assistance and automatic driving of the vehicle 1.

The vehicle control system 11 includes a processor 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automatic driving control unit 29, a driver monitoring system (DMS) 30, a human machine interface (HMI) 31, and a vehicle control unit 32.

The processor 21, the communication unit 22, the map information accumulation unit 23, the GNSS reception unit 24, the external recognition sensor 25, the in-vehicle sensor 26, the vehicle sensor 27, the recording unit 28, the travel assistance/automatic driving control unit 29, the driver monitoring system (DMS) 30, the human machine interface (HMI) 31, and the vehicle control unit 32 are connected to each other via a communication network 41. The communication network 41 includes, for example, a bus, an in-vehicle communication network conforming to any standard such as a controller area network (CAN), a local interconnect network (LIN), a local area network (LAN), FlexRay (registered trademark), or Ethernet (registered trademark), and the like. Note that there is also a case where each unit of the vehicle control system 11 is directly connected by, for example, short-range wireless communication (near field communication (NFC)), Bluetooth (registered trademark), or the like without via the communication network 41.

Note that, hereinafter, in a case where each unit of the vehicle control system 11 communicates via the communication network 41, a description of the communication network 41 is to be omitted. For example, in a case where the processor 21 and the communication unit 22 perform communication via the communication network 41, it is simply described that the processor 21 and the communication unit 22 perform communication.

The processor 21 includes various processors such as, for example, a central processing unit (CPU), a micro processing unit (MPU), and an electronic control unit (ECU). The processor 21 controls the entire vehicle control system 11.

The communication unit 22 communicates with various types of equipment inside and outside the vehicle, other vehicles, servers, base stations, and the like, and transmits and receives various data. As the communication with the outside of the vehicle, for example, the communication unit 22 receives, from the outside, a program for updating software for controlling an operation of the vehicle control system 11, map information, traffic information, information around the vehicle 1, and the like. For example, the communication unit 22 transmits information regarding the vehicle 1 (for example, data indicating a state of the vehicle 1, a recognition result by a recognition unit 73, and the like), information around the vehicle 1, and the like to the outside. For example, the communication unit 22 performs communication corresponding to a vehicle emergency call system such as an eCall.

Note that a communication method of the communication unit 22 is not particularly limited. Furthermore, a plurality of communication methods may be used.

As the communication with the inside of the vehicle, for example, the communication unit 22 performs wireless communication with in-vehicle equipment by a communication method such as wireless LAN, Bluetooth, NFC, or wireless USB (WUSB). For example, the communication unit 22 performs wired communication with in-vehicle equipment through a communication method such as a universal serial bus (USB), a high-definition multimedia interface (HDMI, registered trademark), or a mobile high-definition link (MHL), via a connection terminal (not illustrated) (and a cable if necessary).

Here, the in-vehicle equipment is, for example, equipment that is not connected to the communication network 41 in the vehicle. For example, mobile equipment or wearable equipment carried by a passenger such as a driver, information equipment brought into the vehicle and temporarily installed, and the like are assumed.

For example, the communication unit 22 uses a wireless communication method such as a fourth generation mobile communication system (4G), a fifth generation mobile communication system (5G), long term evolution (LTE), or dedicated short range communications (DSRC), to communicate with a server or the like existing on an external network (for example, the Internet, a cloud network, or a company-specific network) via a base station or an access point.

For example, the communication unit 22 uses a peer to peer (P2P) technology to communicate with a terminal (for example, a terminal of a pedestrian or a store, or a machine type communication (MTC) terminal) existing near the own vehicle. For example, the communication unit 22 performs V2X communication. The V2X communication is, for example, vehicle to vehicle communication with another vehicle, vehicle to infrastructure communication with a roadside device or the like, vehicle to home communication, vehicle to pedestrian communication with a terminal or the like possessed by a pedestrian, or the like.

For example, the communication unit 22 receives an electromagnetic wave transmitted by a road traffic information communication system (vehicle information and communication system (VICS), registered trademark), such as a radio wave beacon, an optical beacon, or FM multiplex broadcasting.

The map information accumulation unit 23 accumulates a map acquired from the outside and a map created by the vehicle 1. For example, the map information accumulation unit 23 accumulates a three-dimensional high-precision map, a global map having lower accuracy than the high-precision map and covering a wide area, and the like.

The high-precision map is, for example, a dynamic map, a point cloud map, a vector map (also referred to as an advanced driver assistance system (ADAS) map), or the like. The dynamic map is, for example, a map including four layers of dynamic information, semi-dynamic information, semi-static information, and static information, and is supplied from an external server or the like. The point cloud map is a map including a point cloud (point group data). The vector map is a map in which information such as a lane and a position of a traffic light is associated with the point cloud map. The point cloud map and the vector map may be supplied from, for example, an external server or the like, or may be created by the vehicle 1 as a map for performing matching with a local map to be described later on the basis of a sensing result by a radar 52, a LiDAR 53, or the like, and may be accumulated in the map information accumulation unit 23. Furthermore, in a case where the high-precision map is supplied from an external server or the like, in order to reduce a communication capacity, for example, map data of several hundred meters square regarding a planned path on which the vehicle 1 will travel is acquired from a server or the like.

The GNSS reception unit 24 receives a GNSS signal from a GNSS satellite, and supplies to the travel assistance/automatic driving control unit 29.

The external recognition sensor 25 includes various sensors used for recognizing a situation outside the vehicle 1, and supplies sensor data from each sensor to each unit of the vehicle control system 11. Any type and number of sensors included in the external recognition sensor 25 may be adopted.

For example, the external recognition sensor 25 includes, a camera 51, the radar 52, the light detection and ranging or laser imaging detection and ranging (LiDAR) 53, and an ultrasonic sensor 54. Any number of the cameras 51, the radar 52, the LiDAR 53, and the ultrasonic sensor 54 may be adopted, and an example of a sensing area of each sensor will be described later.

Note that, as the camera 51, for example, a camera of any image capturing system such as a time of flight (ToF) camera, a stereo camera, a monocular camera, or an infrared camera is used as necessary.

Furthermore, for example, the external recognition sensor 25 includes an environment sensor for detection of weather, a meteorological state, a brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone to be used to detect sound around the vehicle 1, a position of a sound source, and the like.

The in-vehicle sensor 26 includes various sensors for detection of information inside the vehicle, and supplies sensor data from each sensor to each unit of the vehicle control system 11. Any type and number of sensors included in the in-vehicle sensor 26 may be adopted.

For example, the in-vehicle sensor 26 includes a camera, a radar, a seating sensor, a steering wheel sensor, a microphone, a biological sensor, and the like. As the camera, for example, a camera of any image capturing system such as a ToF camera, a stereo camera, a monocular camera, or an infrared camera can be used. The biological sensor is provided, for example, in a seat, a steering wheel, or the like, and detects various kinds of biological information of a passenger such as a driver.

The vehicle sensor 27 includes various sensors for detection of a state of the vehicle 1, and supplies sensor data from each sensor to each unit of the vehicle control system 11. Any type and number of sensors included in the vehicle sensor 27 may be adopted.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects a number of revolutions of an engine or a motor, an air pressure sensor that detects an air pressure of a tire, a slip rate sensor that detects a slip rate of a tire, and a wheel speed sensor that detects a rotation speed of a wheel. For example, the vehicle sensor 27 includes a battery sensor that detects a remaining amount and a temperature of a battery, and an impact sensor that detects an external impact.

The recording unit 28 includes, for example, a magnetic storage device such as a read only memory (ROM), a random access memory (RAM), and a hard disc drive (HDD), a semiconductor storage device, an optical storage device, a magneto-optical storage device, and the like. The recording unit 28 stores various programs, data, and the like used by each unit of the vehicle control system 11. For example, the recording unit 28 records a rosbag file including a message transmitted and received by a Robot Operating System (ROS) in which an application program related to automatic driving operates. For example, the recording unit 28 includes an Event Data Recorder (EDR) and a Data Storage System for Automated Driving (DSSAD), and records information of the vehicle 1 before and after an event such as an accident.

The travel assistance/automatic driving control unit 29 controls travel support and automatic driving of the vehicle 1. For example, the travel assistance/automatic driving control unit 29 includes an analysis unit 61, an action planning unit 62, and an operation control unit 63.

The analysis unit 61 performs analysis processing on a situation of the vehicle 1 and surroundings. The analysis unit 61 includes an own-position estimation unit 71, a sensor fusion unit 72, and the recognition unit 73.

The own-position estimation unit 71 estimates an own-position of the vehicle 1 on the basis of sensor data from the external recognition sensor 25 and a high-precision map accumulated in the map information accumulation unit 23. For example, the own-position estimation unit 71 generates a local map on the basis of sensor data from the external recognition sensor 25, and estimates the own-position of the vehicle 1 by performing matching of the local map with the high-precision map. The position of the vehicle 1 is based on, for example, a center of a rear wheel pair axle.

The local map is, for example, a three-dimensional high-precision map, an occupancy grid map, or the like created using a technique such as simultaneous localization and mapping (SLAM). The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated in a unit of a grid. The occupancy state of the object is indicated by, for example, a presence or absence or a presence probability of the object. The local map is also used for detection processing and recognition processing of a situation outside the vehicle 1 by the recognition unit 73, for example.

Note that the own-position estimation unit 71 may estimate the own-position of the vehicle 1 on the basis of a GNSS signal and sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 performs detection processing and recognition processing of a situation outside the vehicle 1.

For example, the recognition unit 73 performs detection processing and recognition processing of a situation outside the vehicle 1 on the basis of information from the external recognition sensor 25, information from the own-position estimation unit 71, information from the sensor fusion unit 72, and the like.

Specifically, for example, the recognition unit 73 performs detection processing, recognition processing, and the like of an object around the vehicle 1. The detection processing of the object is, for example, processing of detecting a presence or absence, a size, a shape, a position, a movement, and the like of the object. The recognition processing of the object is, for example, processing of recognizing an attribute such as a type of the object or identifying a specific object. However, the detection processing and the recognition processing are not necessarily clearly divided, and may overlap.

For example, the recognition unit 73 detects an object around the vehicle 1 by performing clustering for classifying a point cloud on the basis of sensor data of the LiDAR, the radar, or the like for each cluster of point groups. As a result, a presence or absence, a size, a shape, and a position of the object around the vehicle 1 are detected.

For example, the recognition unit 73 detects a movement of the object around the vehicle 1 by performing tracking that is following a movement of the cluster of point groups classified by clustering. As a result, a speed and a traveling direction (a movement vector) of the object around the vehicle 1 are detected.

For example, the recognition unit 73 recognizes a type of the object around the vehicle 1 by performing object recognition processing such as semantic segmentation on an image data supplied from the camera 51.

Note that, as the object to be detected or recognized, for example, a vehicle, a person, a bicycle, an obstacle, a structure, a road, a traffic light, a traffic sign, a road sign, and the like are assumed.

For example, the recognition unit 73 performs recognition processing of traffic rules around the vehicle 1 on the basis of a map accumulated in the map information accumulation unit 23, an estimation result of the own-position, and a recognition result of the object around the vehicle 1. By this processing, for example, a position and a state of a traffic light, contents of a traffic sign and a road sign, contents of a traffic regulation, a travelable lane, and the like are recognized.

For example, the recognition unit 73 performs recognition processing of an environment around the vehicle 1. As the surrounding environment to be recognized, for example, weather, a temperature, a humidity, a brightness, road surface conditions, and the like are assumed.

The action planning unit 62 creates an action plan of the vehicle 1. For example, the action planning unit 62 creates an action plan by performing processing of path planning and path following.

Note that the path planning (global path planning) is processing of planning a rough path from a start to a goal. This path planning is called track planning, and also includes processing of track generation (local path planning) that enables safe and smooth traveling in the vicinity of the vehicle 1, in consideration of motion characteristics of the vehicle 1 in the path planned by the path planning.

Path following is processing of planning an operation for safely and accurately traveling a path planned by the path planning within a planned time. For example, a target speed and a target angular velocity of the vehicle 1 are calculated.

The operation control unit 63 controls an operation of the vehicle 1 in order to realize the action plan created by the action planning unit 62.

For example, the operation control unit 63 controls a steering control unit 81, a brake control unit 82, and a drive control unit 83 to perform acceleration/deceleration control and direction control such that the vehicle 1 travels on a track calculated by the track planning. For example, the operation control unit 63 performs cooperative control for the purpose of implementing functions of the ADAS, such as collision avoidance or impact mitigation, follow-up traveling, vehicle speed maintaining traveling, collision warning of the own vehicle, lane deviation warning of the own vehicle, and the like. Furthermore, for example, the operation control unit 63 performs cooperative control for the purpose of automatic driving or the like of autonomously traveling without depending on an operation of the driver.

The DMS 30 performs driver authentication processing, recognition processing of a state of the driver, and the like on the basis of sensor data from the in-vehicle sensor 26, input data inputted to the HMI 31, and the like. As the state of the driver to be recognized, for example, a physical condition, an awakening level, a concentration level, a fatigue level, a line-of-sight direction, a drunkenness level, a driving operation, a posture, and the like are assumed.

Note that the DMS 30 may perform authentication processing of a passenger other than the driver and recognition processing of a state of the passenger. Furthermore, for example, the DMS 30 may perform recognition processing of a situation inside the vehicle on the basis of sensor data from the in-vehicle sensor 26. As the situation inside the vehicle to be recognized, for example, a temperature, a humidity, a brightness, odor, and the like are assumed.

The HMI 31 is used for inputting various data, instructions, and the like, generates an input signal on the basis of the inputted data, instructions, and the like, and supplies to each unit of the vehicle control system 11. For example, the HMI 31 includes: operation devices such as a touch panel, a button, a microphone, a switch, and a lever; an operation device that can be inputted by a method other than manual operation, such as with voice or a gesture; and the like. Note that, for example, the HMI 31 may be a remote control device using infrared ray or other radio waves, or external connection equipment such as mobile equipment or wearable equipment corresponding to an operation of the vehicle control system 11.

Furthermore, the HMI 31 performs output control to control generation and output of visual information, auditory information, and tactile information to the passenger or the outside of the vehicle, and to control output contents, output timings, an output method, and the like. The visual information is, for example, information indicated by an image or light such as an operation screen, a state display of the vehicle 1, a warning display, or a monitor image indicating a situation around the vehicle 1. The auditory information is, for example, information indicated by sound such as guidance, warning sound, or a warning message. The tactile information is, for example, information given to a tactile sense of the passenger by a force, a vibration, a movement, or the like.

As a device that outputs visual information, for example, a display device, a projector, a navigation device, an instrument panel, a camera monitoring system (CMS), an electronic mirror, a lamp, and the like are assumed. The display device may be, for example, a device that displays visual information in a passenger's field of view, such as a head-up display, a transmissive display, or a wearable device having an augmented reality (AR) function, in addition to a device having a normal display.

As a device that outputs auditory information, for example, an audio speaker, a headphone, an earphone, or the like is assumed.

As a device that outputs tactile information, for example, a haptic element using haptic technology, or the like, is assumed. The haptic element is provided, for example, on a steering wheel, a seat, or the like.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including a steering wheel and the like, an electric power steering, and the like. The steering control unit 81 includes, for example, a controlling unit such as an ECU that controls the steering system, an actuator that drives the steering system, and the like.

The brake control unit 82 performs detection, control, and the like of a state of a brake system of the vehicle 1. The brake system includes, for example, a brake mechanism including a brake pedal, an antilock brake system (ABS), and the like. The brake control unit 82 includes, for example, a controlling unit such as an ECU that controls a brake system, an actuator that drives the brake system, and the like.

The drive control unit 83 performs detection, control, and the like of a state of a drive system of the vehicle 1. The drive system includes, for example, an accelerator pedal, a driving force generation device for generation of a driving force such as an internal combustion engine or a driving motor, a driving force transmission mechanism for transmission of the driving force to wheels, and the like. The drive control unit 83 includes, for example, a controlling unit such as an ECU that controls the drive system, an actuator that drives the drive system, and the like.

The body system control unit 84 performs detection, control, and the like of a state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a controlling unit such as an ECU that controls the body system, an actuator that drives the body system, and the like.

The light control unit 85 performs detection, control, and the like of a state of various lights of the vehicle 1. As the lights to be controlled, for example, a headlight, a backlight, a fog light, a turn signal, a brake light, a projection, a display of a bumper, and the like are assumed. The light control unit 85 includes a controlling unit such as an ECU that controls lights, an actuator that drives lights, and the like.

The horn control unit 86 performs detection, control, and the like of state of a car horn of the vehicle 1. The horn control unit 86 includes, for example, a controlling unit such as an ECU that controls the car horn, an actuator that drives the car horn, and the like.

Figure 2:
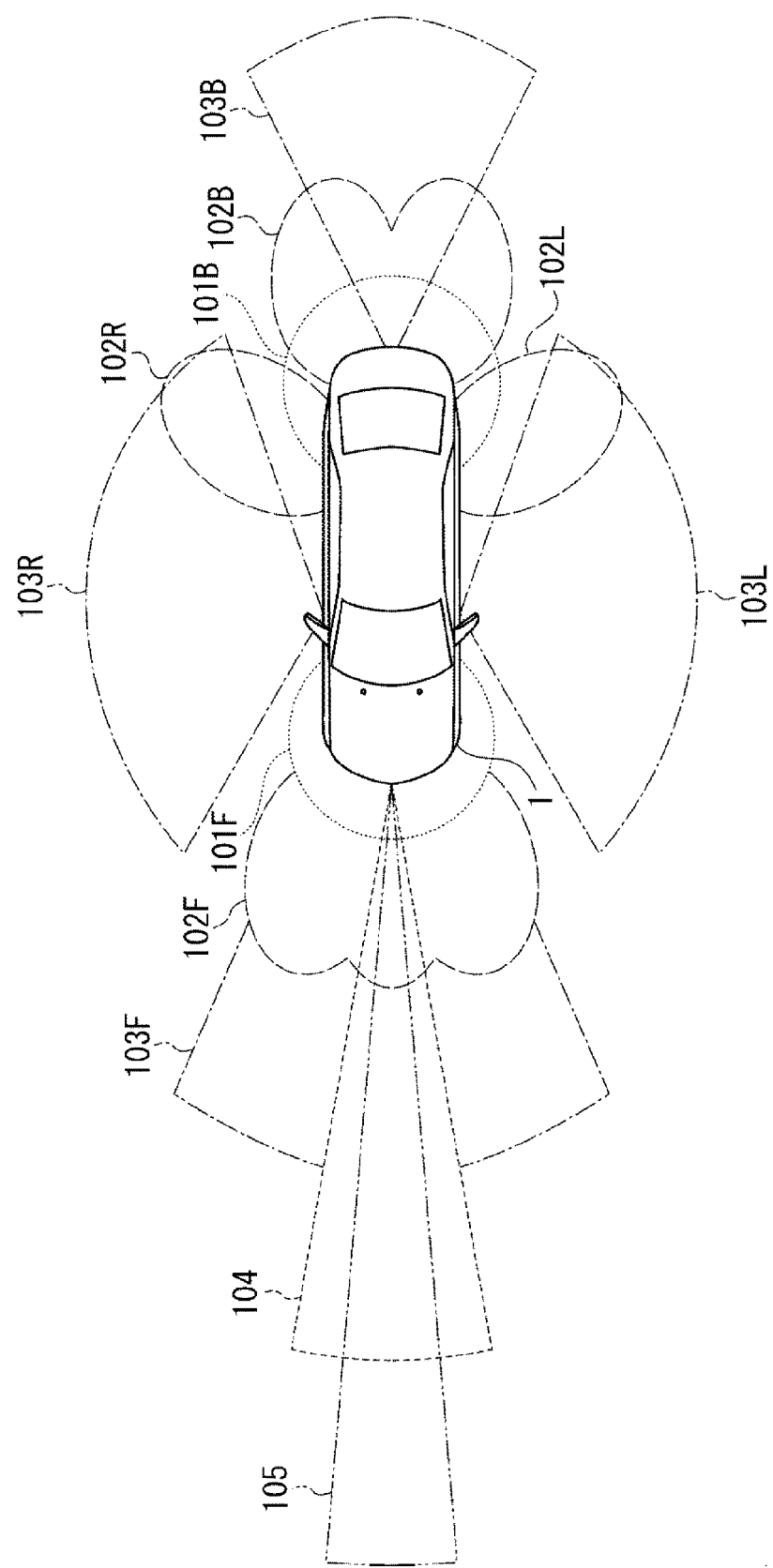
FIG. 2 is a view illustrating an example of a sensing area.

FIG. 2 is a view illustrating an example of a sensing area by the camera 51, the radar 52, the LiDAR 53, and the ultrasonic sensor 54 of the external recognition sensor 25 in FIG. 1.

Sensing areas 101F and 101B illustrate examples of sensing areas of the ultrasonic sensor 54. The sensing area 101F covers a periphery of a front end of the vehicle 1. The sensing area 101B covers a periphery of a rear end of the vehicle 1.

Sensing results in the sensing areas 101F and 101B are used, for example, for parking assistance and the like of the vehicle 1.

Sensing areas 102F to 102B illustrate examples of sensing areas of the radar 52 for a short distance or a middle distance. The sensing area 102F covers a position farther than the sensing area 101F in front of the vehicle 1. The sensing area 102B covers a position farther than the sensing area 101B behind the vehicle 1. The sensing area 102L covers a rear periphery of a left side surface of the vehicle 1. The sensing area 102R covers a rear periphery of a right side surface of the vehicle 1.

A sensing result in the sensing area 102F is used, for example, for detection of a vehicle, a pedestrian, or the like existing in front of the vehicle 1, and the like. A sensing result in the sensing area 102B is used, for example, for a collision prevention function or the like behind the vehicle 1. Sensing results in the sensing areas 102L and 102R are used, for example, for detection of an object in a blind spot on a side of the vehicle 1, and the like.

Sensing areas 103F to 103B illustrate examples of sensing areas by the camera 51. The sensing area 103F covers a position farther than the sensing area 102F in front of the vehicle 1. The sensing area 103B covers a position farther than the sensing area 102B behind the vehicle 1. The sensing area 103L covers a periphery of a left side surface of the vehicle 1. The sensing area 103R covers a periphery of a right side surface of the vehicle 1.

A sensing result in the sensing area 103F is used for, for example, recognition of a traffic light or a traffic sign, a lane departure prevention assist system, and the like. A sensing result in the sensing area 103B is used for, for example, parking assistance, a surround view system, and the like. Sensing results in the sensing areas 103L and 103R are used, for example, in a surround view system or the like.

A sensing area 104 shows an example of a sensing area of the LiDAR 53. The sensing area 104 covers a position farther than the sensing area 103F in front of the vehicle 1. Whereas, the sensing area 104 has a narrower range in a left-right direction than the sensing area 103F.

A sensing result in the sensing area 104 is used for, for example, emergency braking, collision avoidance, pedestrian detection, and the like.

A sensing area 105 illustrates an example of a sensing area of the radar 52 for a long distance. The sensing area 105 covers a position farther than the sensing area 104 in front of the vehicle 1. Whereas, the sensing area 105 has a narrower range in a left-right direction than the sensing area 104.

A sensing result in the sensing area 105 is used for, for example, adaptive cruise control (ACC) and the like.

Note that the sensing area of each sensor may have various configurations other than those in FIG. 2. Specifically, the ultrasonic sensor 54 may also perform sensing on a side of the vehicle 1, or the LiDAR 53 may perform sensing behind the vehicle 1.

2. PROBLEM OF OCCUPANCY GRID MAP

Next, a problem of the occupancy grid map will be described with reference to FIGS. 3A, 3B, 4A, 4B, 5A, 5B, 6A, and 6B.

As described above, the occupancy grid map is a map representing an occupancy state of an object in a space around the vehicle 1 in a unit of a grit.

For example, the occupancy state of each grid is represented by a presence probability of an object. The presence probability is expressed, for example, within a range from 0 (an object is not present) to 1 (an object is present), and approaches 1 as the probability that an object is present increases, and approaches 0 as the probability that an object is present decreases.

Furthermore, for example, the occupancy state of each grid is represented by a presence or absence of an object. For example, the occupancy state of each grid is represented by three types of values: present (an object is present), absent (an object is not present), and unknown. For example, in a grid whose occupancy state is other than "unknown", the occupancy state is set to "present" in a case where the presence probability is equal to or greater than a predetermined threshold value, and the occupancy state is set to "absent" in a case where the presence probability is less than the predetermined threshold value.

For example, the action planning unit 62 of the vehicle 1 sets a nearest path so as to pass through an area where no object is present in the occupancy grid map.

Furthermore, expansion processing is usually performed on the occupancy grid map. The expansion processing is processing of expanding, to an adjacent grid, a boundary of an area (hereinafter, referred to as an occupied area) where each object occupies (is present) on the occupancy grid map. As a result, the occupied area of each object becomes larger than an actual area of the object in the occupancy grid map, and a risk of collision or contact with the object is reduced even if the vehicle 1 sets a path near the boundary of the occupied area.

Furthermore, in a conventional occupancy grid map, certain expansion processing is performed on all objects. That is, a constant expansion amount is applied to all objects, and a boundary of an occupied area of each object is widened by the same number of grids.

Here, for example, when the expansion amount is increased, a margin for each object increases, and a path that enables safe avoidance even if a mobile object such as a vehicle or a person moves is to be set. Whereas, since the occupied area of each object is increased, a range in which the vehicle 1 can pass is narrowed, which may make it difficult to set a path or cause the vehicle 1 to take a detour.

Conversely, when the expansion amount is reduced, the range in which the vehicle 1 can pass is widened. Whereas, since the margin for each object decreases, a risk of collision with a mobile object increases.

Figure 3A:
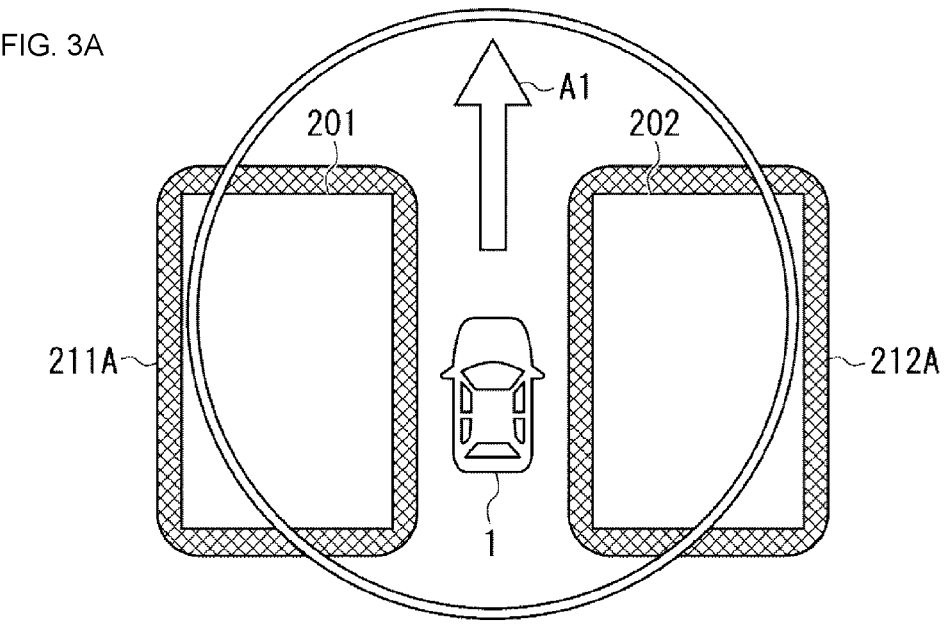
FIGS. 3A and 3B are views for explaining a problem of expansion processing of an occupancy grid map.
Figure 3B:
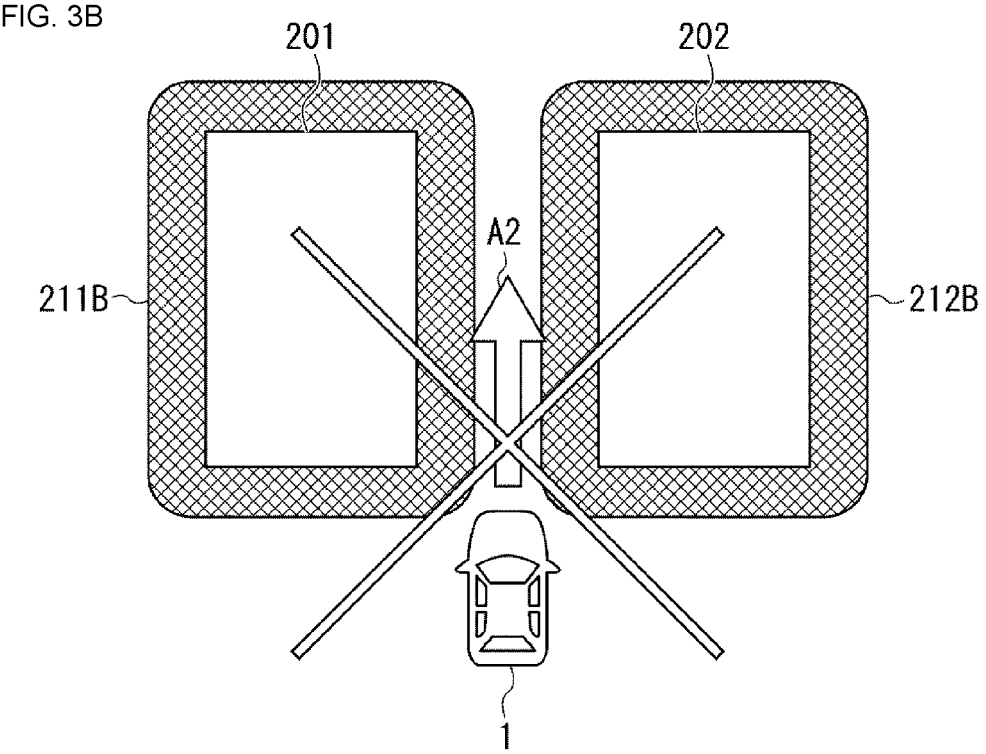

For example, FIGS. 3A and 3B illustrate an example in which the vehicle 1 is about to pass between a stationary object 201 and a stationary object 202.

FIG. 3A illustrates an example in which the expansion amount is reduced. In this case, an occupied area 211A for the stationary object 201 and an occupied area 212A for the stationary object 202 decreases. Then, a space that allows traveling is secured between the occupied area 211A and the occupied area 212A, and the vehicle 1 can travel in a direction of arrow A1.

Whereas, FIG. 3B illustrates an example in which the expansion amount is increased. In this case, an occupied area 211B for the stationary object 201 and an occupied area 212B for the stationary object 202 are increased. Then, a space that allows traveling is not secured between the occupied area 211B and the occupied area 212B, and the vehicle 1 cannot move in a direction of arrow A2 and needs to detour.

Figure 4A:
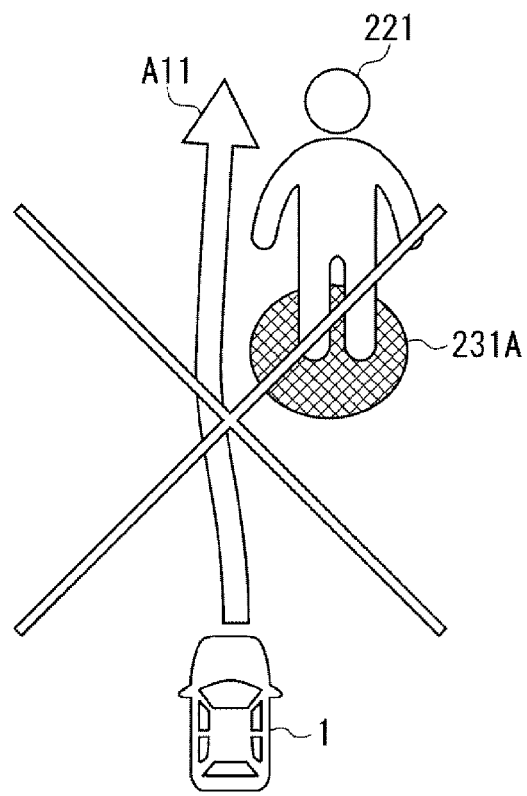
FIGS. 4A and 4B are views for explaining a problem of the expansion processing of the occupancy grid map.
Figure 4B:
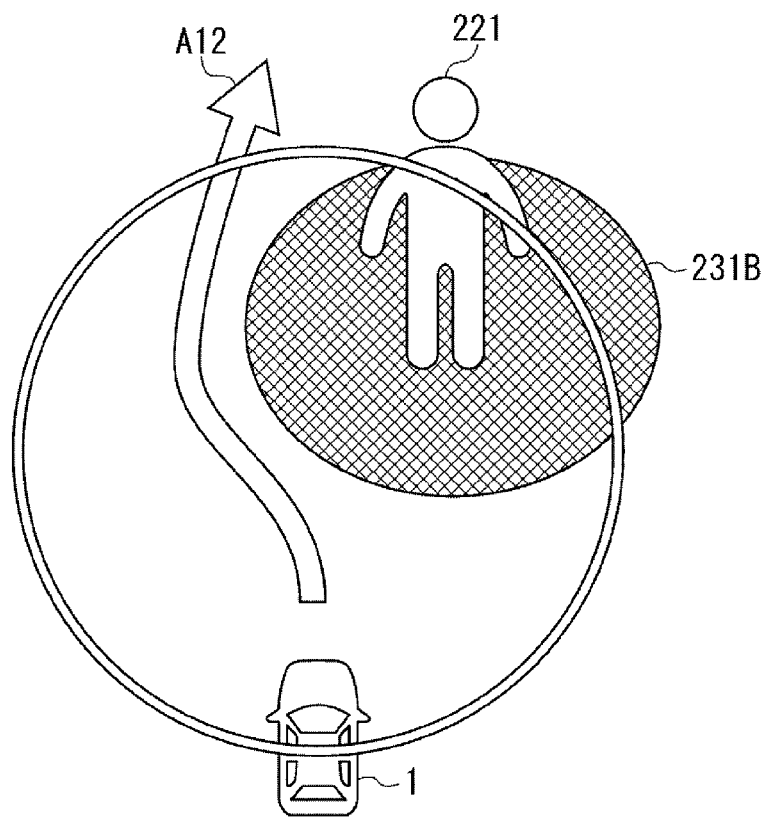

FIGS. 4A and 4B illustrate an example in which the vehicle 1 is about to pass by a person 221.

FIG. 4A illustrates an example in which the expansion amount is reduced. In this case, an occupied area 231A for the person 221 becomes small, and a margin decreases. Therefore, the vehicle 1 travels immediately near the person 221, and a risk of collision or contact with the person 221 increases.

Whereas, FIG. 4B illustrates an example in which the expansion amount is increased. In this case, an occupied area 231B for the person 221 is increased, and a margin is increased. Therefore, the vehicle 1 travels at a position away from the person 221, and the risk of collision or contact with the person 221 is reduced.

As described above, in the conventional expansion processing, for example, it is difficult to safely pass through a narrow area between objects while avoiding the objects.

Furthermore, in general, gradual decrease processing and gradual increase processing of the presence probability are performed on the occupancy grid map. The gradual decrease processing of the presence probability is processing of gradually decreasing the presence probability of a certain grid to 0 over time without immediately changing 0, even when an object is no longer detected in the grid. The gradual increase processing of the presence probability is processing of gradually increasing the presence probability of a certain grid to 1 over time without immediately changing to 1, even when an object is detected in the grid. By the gradual decrease processing and the gradual increase processing of the presence probability, an occupancy state of each grid is prevented from erroneously set due to noise or the like.

Furthermore, in conventional gradual decrease processing and gradual increase processing of the presence probability, a gradual decrease time and a gradual increase time are set to be constant. Here, the gradual decrease time is a time required for the presence probability to change from 1 to 0. The gradual increase time is a time required for the presence probability to change from 0 to 1.

For example, when the gradual decrease time and the gradual increase time are shortened, a movement or the like of the object is to be quickly reflected in the occupancy grid map. Whereas, the occupancy state of each grid is likely to change due to noise or the like, and there is a high risk that the occupancy state is erroneously set. For example, there is a high risk that an occupancy state of an area where a stationary object actually is present is set to "absent".

Conversely, when the gradual decrease time and the gradual increase time are lengthened, the occupancy state of each grid is less likely to change due to noise or the like. Whereas, a movement or the like of the object is not quickly reflected in the occupancy grid map, and for example, an occupancy state of an area where an object has already moved and is no longer present is set to "present", and there is a high possibility that the vehicle 1 cannot pass.

Figure 5A:
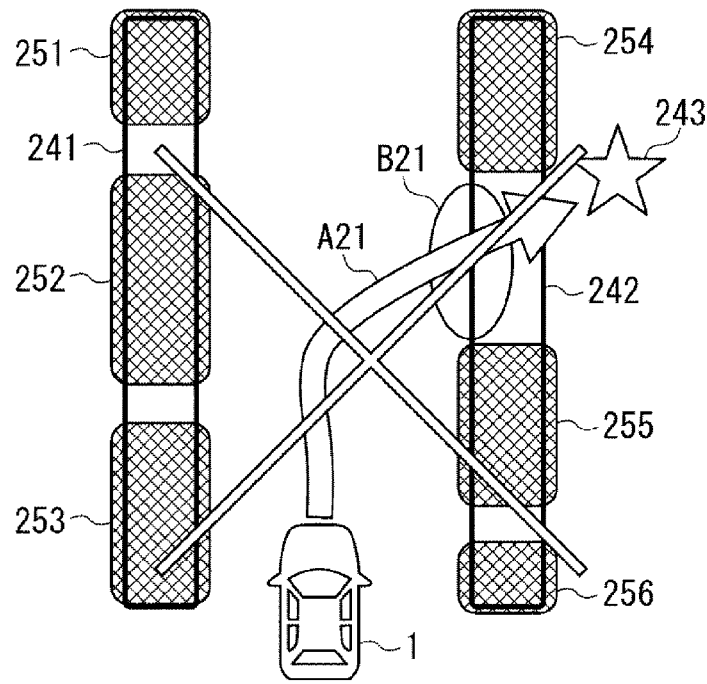
FIGS. 5A and 5B are views for explaining a problem of gradual decrease processing of a presence probability of the occupancy grid map.
Figure 5B:
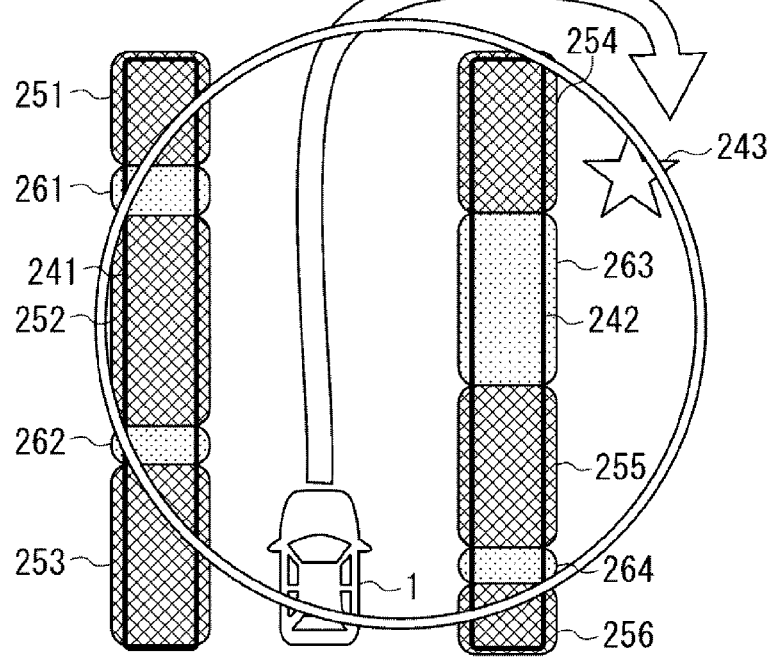

For example, FIGS. 5A and 5B illustrates an example in which the vehicle 1 is passing between a stationary object 241 and a stationary object 241 and aiming at a goal 243 on the right of the stationary object 242.

FIG. 5A illustrates an example in which the gradual decrease time is shortened. In this example, occupied areas 251 to 253 are set for the stationary object 241, and occupied areas 254 to 256 are set for the stationary object 242. Whereas, an occupied area is not set between the occupied area 251 and the occupied area 252 and between the occupied area 252 and the occupied area 253 due to a low reflectance of the stationary object 241 or the like. Furthermore, an occupied area is not set between the occupied area 254 and the occupied area 255 and between the occupied area 255 and the occupied area 256 due to a low reflectance of the stationary object 242 or the like.

Therefore, the vehicle 1 determines that there is no object in a circled area B21 and proceeds in a direction of arrow A21, and a risk of colliding with the stationary object 242 increases.

FIG. 5B illustrates an example in which the gradual decrease time is lengthened. In this example, an occupied area 261 and an occupied area 262 are also set between the occupied area 251 and the occupied area 252 and between the occupied area 252 and the occupied area 253. Furthermore, an occupied area 263 and an occupied area 264 are also set between the occupied area 254 and the occupied area 255 and between the occupied area 255 and the occupied area 256.

Therefore, the vehicle 1 travels in a direction of arrow A22 while avoiding the stationary object 242, and can arrive at the goal 243 without colliding with the stationary object 242.

Figure 6A:
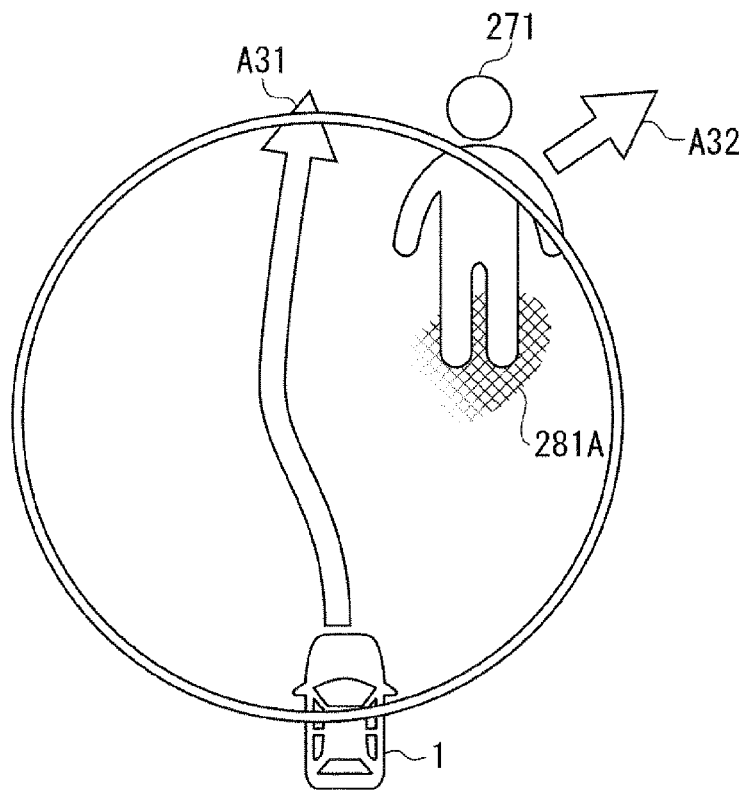
FIGS. 6A and 6B are views for explaining a problem of the gradual decrease processing of a presence probability of the occupancy grid map.
Figure 6B:
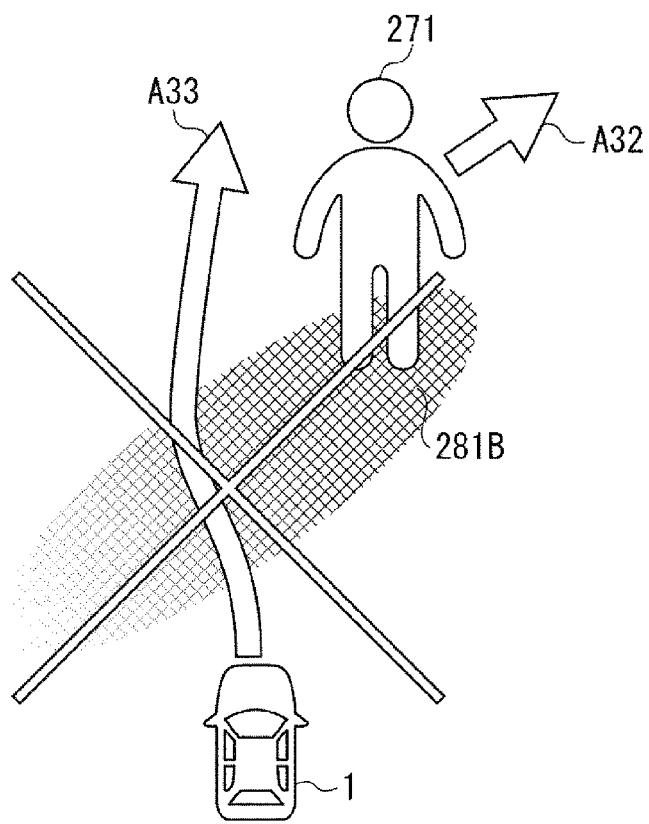

FIGS. 6A and 6B illustrates an example in which the vehicle 1 is about to pass by a person 271 who is walking in a direction of arrow A32.

FIG. 6A illustrates an example in which the gradual decrease time is shortened. In this example, a time until an occupancy state of a grid after the person 271 walks changes to "absent" is shortened. Therefore, an occupied area 281A for the person 271 is narrowed, and the vehicle 1 can quickly pass through the area after the person 271 disappears, in a direction of arrow A31.

FIG. 6B illustrates an example in which the gradual decrease time is lengthened. In this example, a time until an occupancy state of a grid after the person 271 walks changes to "absent" is lengthened. Therefore, an occupied area 281B for the person 271 becomes long in a front-back direction of the person 271, and the vehicle 1 cannot move in a direction of arrow A33 even though the person 271 is not present.

As described above, in the conventional gradual decrease processing, for example, it is difficult to safely pass through a narrow area between objects while avoiding the objects.

The present technology is intended to solve these problems.

3. EMBODIMENT

Next, an embodiment of the present technology will be described with reference to FIGS. 7 to 15.

Configuration Example of Information Processing Unit 301

FIG. 7 illustrates a configuration example of an information processing unit 301 to which the present technology is applied.

The information processing unit 301 is included in the recognition unit 73 of the vehicle control system 11 in FIG. 1, for example, and creates an occupancy grid map. The information processing unit 301 includes an attribute detection unit 311, a map creation unit 312, an attribute setting unit 313, and a correction unit 314.

The camera 51 captures an image of surroundings of the vehicle 1 and supplies image data including information indicating an attribute of an object around the vehicle 1, to the information processing unit 301.

The LiDAR 53 performs sensing around the vehicle 1 to detect a position of an object around the vehicle 1, and generates a three-dimensional point cloud indicating distribution of reflection points of each object, and supplies to the information processing unit 301.

The attribute detection unit 311 detects an attribute of an object around the vehicle 1 on the basis of image data and a point cloud. The attribute detection unit 311 includes a classification unit 321, an object detection unit 322, and a movement estimation unit 323.

The classification unit 321 recognizes a type of an object, which is one of attributes of the object around the vehicle 1, on the basis of image data. The classification unit 321 supplies a recognition result of the type of the object to the object detection unit 322.

The object detection unit 322 detects an object in a three-dimensional space around the vehicle 1 on the basis of a point cloud. Furthermore, the object detection unit 322 associates the type of the object recognized by the classification unit 321 with the detected object. The object detection unit 322 supplies an object detection result to the movement estimation unit 323 and the attribute setting unit 313.

The movement estimation unit 323 performs tracking of an object detected by the object detection unit 322 to estimate a movement of the object, which is one of attributes of the object around the vehicle 1. The movement estimation unit 323 supplies an estimation result of the movement of the object to the attribute setting unit 313.

The map creation unit 312 creates an occupancy grid map around the vehicle 1 on the basis of a point cloud. The map creation unit 312 supplies the occupancy grid map to the attribute setting unit 313.

The attribute setting unit 313 sets an attribute of each grid of the occupancy grid map on the basis of a detection result of the object and a result of the movement estimation. The attribute setting unit 313 supplies the occupancy grid map with the attribute to the correction unit 314.

The correction unit 314 corrects the occupancy grid map on the basis of an attribute of each grid. The correction unit 314 supplies the corrected occupancy grid map to a subsequent stage (for example, the action planning unit 62 or the like).

<Map Creation Processing>

Figure 8:
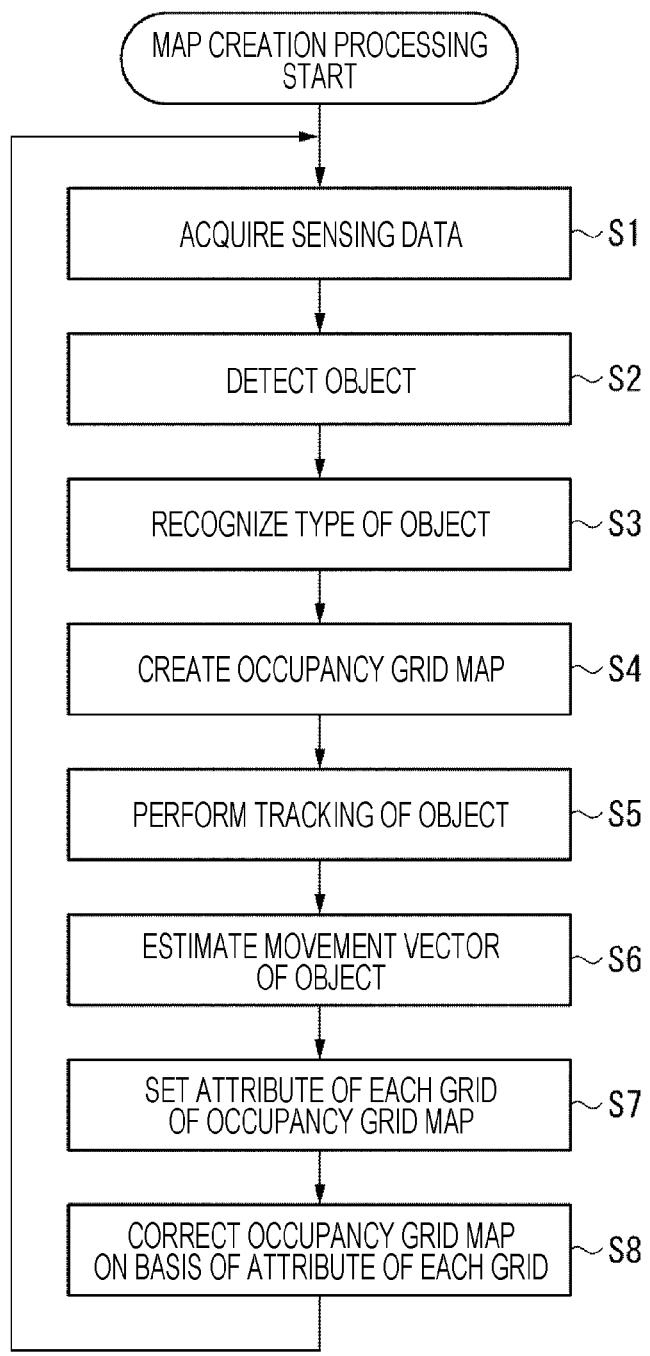
FIG. 8 is a flowchart for explaining map creation processing.

Next, with reference to a flowchart of FIG. 8, map creation processing executed by the information processing unit 301 will be described.

This processing is started when power of the vehicle 1 is turned on, and is ended when the power is turned off, for example.

In step S1, the information processing unit 301 acquires sensing data.

Specifically, the camera 51 captures an image of surroundings of the vehicle 1, and supplies obtained image data to the information processing unit 301. The classification unit 321 acquires the image data supplied from the camera 51. Note that the image data may be either color or monochrome.

The LiDAR 52 performs sensing on surroundings of the vehicle 1, creates a three-dimensional point cloud, and supplies the point cloud to the information processing unit 301. The map creation unit 312 and the object detection unit 322 acquire the point cloud supplied from the LiDAR 52.

In step S2, the object detection unit 322 detects an object. Specifically, the object detection unit 322 appropriately removes noise or the like from the point cloud, and then performs clustering to detect a position, a size, and a shape of the object in the point cloud.

In step S3, the classification unit 321 recognizes a type of the object. Specifically, the classification unit 321 uses instance segmentation to recognize a type of the object to which each pixel belongs, for each pixel of image data. The type of the object is classified into, for example, a vehicle, a pedestrian, a bicycle, a road surface, a guardrail, a building, and the like. The classification unit 321 supplies a recognition result of the type of the object to the object detection unit 322.

The object detection unit 322 gives an attribute to each point of the point cloud by associating each point with an image coordinate system. The object detection unit 322 supplies information indicating a position, a size, a shape, and a type of the object in the three-dimensional coordinate system, to the attribute setting unit 313 and the movement estimation unit 323.

In step S4, the map creation unit 312 creates an occupancy grid map. Specifically, the map creation unit 312 appropriately removes noise or the like from a point cloud, then divides the three-dimensional space into grids of a predetermined size, and sets an occupancy state indicating a presence or absence of an object for each grid.

For example, in the point cloud, an occupancy state of a grid corresponding to an area where reflectance is equal to or greater than a predetermined threshold value is set to "present" indicating a presence of an object. An occupancy state of a grid corresponding to an area through which reflected light passes is set to "absent" indicating an absence of an object. An occupancy state of a grid corresponding to an area where reflected light has not returned is set to "unknown" indicating that a presence or absence of an object is unknown in all the areas in a radiation direction through which a laser would pass from an emission position of the laser. The map creation unit 312 supplies the created occupancy grid map to the attribute setting unit 313.

Note that the processing in steps S2 and S3 and the processing in step S4 are performed in parallel, for example.

In step S5, the movement estimation unit 323 performs tracking of the object. Specifically, the movement estimation unit 323 uses a Kalman filter, a particle filter, or the like to recognize a movement of each object (a cluster of point groups) detected in the point cloud. At this time, the movement estimation unit 323 applies the Kalman filter or the particle filter in accordance with characteristics (for example, a difference between a mobile object and a stationary object, an assumed speed, and the like) of each object, for example.

In step S6, the movement estimation unit 323 estimates a movement vector of the object. Specifically, the movement estimation unit 323 estimates the movement vector of each object, that is, a speed and a traveling direction (a moving direction) of each object on the basis of a result of tracking each object. The movement estimation unit 323 supplies information indicating an estimation result of the movement vector of each object to the attribute setting unit 313.

In step S7, the attribute setting unit 313 sets an attribute of each grid of the occupancy grid map on the basis of the detection result of the attribute of each object and the estimation result of the movement vector of each object. Specifically, for a grid whose occupancy state of the occupancy grid map is "present", the attribute setting unit 313 sets, as attributes, whether an object in the grid is a stationary object or a mobile object, and a type, a speed, and a traveling direction of the object. Note that, in a case where a mobile object is standing still, an attribute of a grid including the mobile object is set to a mobile object. The attribute setting unit 313 supplies the occupancy grid map with the attribute to the correction unit 314.

In step S8, the correction unit 314 corrects the occupancy grid map on the basis of the attribute of each grid.

Specifically, the correction unit 314 executes the expansion processing on the basis of the attribute of each grid. For example, the correction unit 314 sets an expansion amount and an expansion direction on the basis of an attribute of a grid at a boundary (an end portion) of the occupied area of each object on the occupancy grid map.

For example, in a case where the attribute of the grid at the boundary of the occupied area is a mobile object, the expansion amount is increased as compared with a case of a stationary object. That is, the occupied area of the mobile object is expanded more greatly than the occupied area of the stationary object.

Furthermore, for example, in a case where the attribute of the grid at the boundary of the occupied area is a mobile object, the expansion amount is increased in a direction closer to a traveling direction. That is, the occupied area of the mobile object is expanded more greatly for the traveling direction.

Moreover, for example, in a case where the attribute of the grid at the boundary of the occupied area is a mobile object, the expansion amount is increased as a speed increases. That is, an occupied area of a mobile object having a higher speed is more greatly expanded.

Furthermore, for example, in a case where the attribute of the grid at the boundary of the occupied area is a mobile object, in a case of a mobile object that is difficult to change a direction of the mobile object, the expansion amount is reduced in a direction farther from the traveling direction. That is, in the occupied area of the mobile object that is difficult to change the direction, the expansion amount decreases as a distance from the traveling direction increases.

FIG. 9 illustrates an example of an expansion amount and an expansion direction for each type of the mobile object. Here, examples of cases are illustrated in which tracking of an object is performed and a traveling direction of the object has been detected and in which tracking of an object is not performed and the traveling direction of the object has not been detected.

For example, in a case where the traveling direction of the object has been detected, the expansion amount in the traveling direction made larger than usual for all the objects. Whereas, the expansion amount in a left-right direction perpendicular to the traveling direction is not changed but kept as usual for a pedestrian, an office robot, and a drone whose direction is easily changed. For a bicycle, a motorcycle, an automobile, and a factory conveyance robot that are difficult to change the direction, the expansion amount in the left-right direction perpendicular to the traveling direction is made smaller than usual. Here, the normal expansion amount is, for example, an expansion amount at a time of standing still.

Note that a case where the traveling direction of the object has not been detected will be described later.

Then, the correction unit 314 expands the occupied area of each object on the occupancy grid map, on the basis of the set expansion amount and expansion direction. As a result, the boundary of the occupied area of each object is expanded to a neighboring grid, on the basis of the set expansion amount and expansion direction.

Furthermore, the correction unit 314 sets an attribute of an expanded grid, that is, a grid whose occupancy state has been corrected to "present" by the expansion processing, to the same value as the attribute of the grid at the boundary of the occupied area before the expansion.

Moreover, in a case where a mobile object and a stationary object overlap each other by the expansion processing, the correction unit 314 adjusts an attribute of a grid of the overlapping portion to the attribute of the stationary object.

Next, the correction unit 314 sets a change coefficient of each grid of the occupancy grid map after the expansion processing. The change coefficient is a coefficient indicating magnitude and a direction in which the presence probability of each grid is changed.

In a case where the change coefficient is a positive value, the presence probability gradually increases at an increase rate according to the change coefficient. Furthermore, as the change coefficient increases, an increase rate of the presence probability increases, a speed at which the presence probability increases (hereinafter, referred to as a gradual increase speed) increases, and a gradual increase time of the presence probability is shortened.

Whereas, in a case where the change coefficient is a negative value, the presence probability gradually decreases at a decrease rate according to the change coefficient. Furthermore, as the change coefficient decreases (as an absolute value of the change coefficient increases), a decrease rate of the presence probability increases, a speed at which the presence probability decreases (hereinafter, referred to as a gradual decrease speed) increases, and a gradual decrease time of the presence probability is shortened.

First, an example of a method of setting a change coefficient for a grid whose occupancy state is "absent" will be described.

In a case where the occupancy state of the grid is "absent", the change coefficient is set to a negative value. That is, the change coefficient is set in a direction in which the presence probability is decreased.

Furthermore, for example, a value of the change coefficient is adjusted on the basis of an occupancy state and an attribute of a grid one cycle before. For example, in a case where the occupancy state of the grid one cycle before is "present", when the attribute of the grid one cycle before is a mobile object, an absolute value of the change coefficient is increased than that when the attribute of the grid one cycle before is a stationary object. As a result, an occupancy state of a grid in an area where a mobile object is no longer present as the mobile object moves is to be reflected more quickly. Furthermore, an occupancy state of a grid in an area where a stationary object is present is prevented from being erroneously detected as "absent" due to noise or the like.

Furthermore, for example, a value of the change coefficient is adjusted on the basis of reliability (of object recognition) of the LiDAR 53, which is a sensing device used to create the occupancy grid map. For example, the absolute value of the change coefficient is made larger as the reliability of the LiDAR 53 is higher, while the absolute value of the change coefficient is reduced as the reliability of the LiDAR 53 is lower. This configuration prevents detection omission of an object from being reflected in the occupancy grid map, for example, in a case where the reliability of the LiDAR 53 is low.

Whereas, for example, in a case where the occupancy state of the grid one cycle before is "absent" or "unknown", a value of the change coefficient is not changed. That is, the change coefficient before one cycle is used as it is.

Next, an example of a method of setting a change coefficient for a grid whose occupancy state is "present" will be described.

In a case where the grid occupancy state is "present", the change coefficient is set to a positive value. That is, the change coefficient is set in a direction in which the presence probability is increased. Furthermore, an absolute value of the change coefficient is increased as compared with a case where the grid occupancy state is "absent". As a result, in each grid, the occupancy state is to be reflected more quickly in a case where the object appears than in a case where the object disappears.

Moreover, for example, a value of the change coefficient is adjusted on the basis of an attribute of the grid. For example, when the attribute of the grid is a mobile object, a value of the change coefficient is increased as compared with a case of a stationary object. As a result, an occupancy state of a grid in an area where a mobile object is present as the mobile object moves is to be reflected more quickly.

Furthermore, for example, similarly to the case where the grid occupancy state is "absent", the value of the change coefficient is adjusted on the basis of the reliability of the LiDAR 53. For example, the value of the change coefficient is made larger as the reliability of the LiDAR 53 is higher, while the value of the change coefficient is reduced as the reliability of the LiDAR 53 is lower. This configuration prevents an erroneously detected object from being reflected in the occupancy grid map, for example, in a case where the reliability of the LiDAR 53 is low.

Next, an example of a method of setting a change coefficient for a grid whose occupancy state is "unknown" will be described.

In a case where the grid occupancy state is "unknown", the change coefficient is set to a negative value. That is, the change coefficient is set in a direction in which the presence probability is decreased.

Furthermore, a value of the change coefficient is adjusted on the basis of an occupancy state and an attribute of a grid one cycle before. For example, in a case where the occupancy state of the grid one cycle before is "present", when the attribute of the grid one cycle before is a mobile object, an absolute value of the change coefficient is increased than that when the attribute of the grid one cycle before is a stationary object. Furthermore, the absolute value of the change coefficient is made smaller than that in a case where the occupancy state of the current grid is "absent". That is, in a case where the occupancy state is "unknown", it is not clear whether or not an object is actually present, so that a decrease in the presence probability is suppressed.

Note that, similarly to the case where the occupancy state of the grid is "absent", a value of the change coefficient may be adjusted or may not be adjusted on the basis of the reliability of the LiDAR 53.

Furthermore, for example, in a case where the occupancy state of the grid one cycle before is "absent" or "unknown", a value of the change coefficient is not changed. That is, the change coefficient before one cycle is used as it is.

Next, the correction unit 314 calculates a presence probability of each grid on the basis of the set change coefficient. The presence probability increases in a case where the change coefficient is positive, and an increase amount of the presence probability increases as the change coefficient increases. However, in a case where the presence probability exceeds 1, the presence probability is corrected to 1. Whereas, the presence probability decreases in a case where the change coefficient is negative, and a decrease amount of the presence probability increases as an absolute value of the change coefficient increases. However, in a case where the presence probability is less than 0, the presence probability is corrected to 0.

Figure 10:
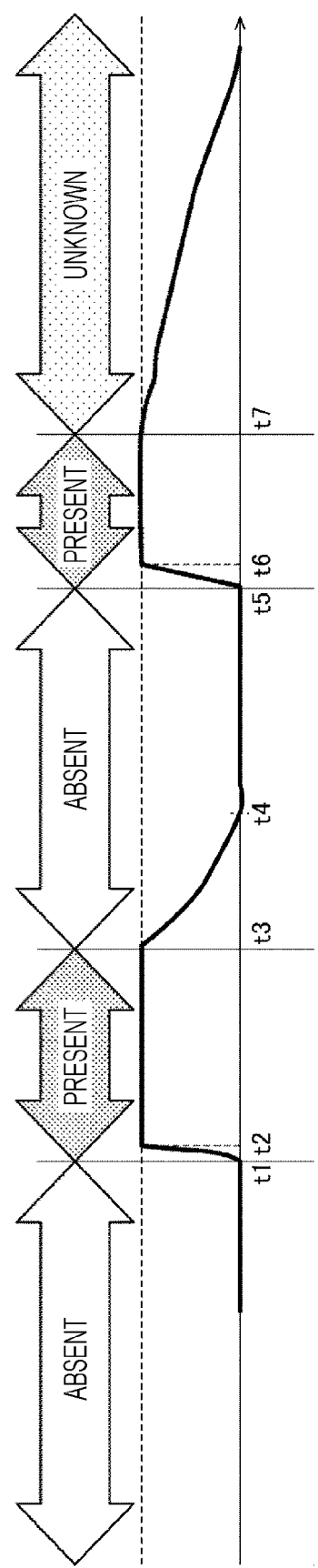
FIG. 10 is a graph illustrating an example of transition of a presence probability in a case where reliability of LiDAR is high.
Figure 11:
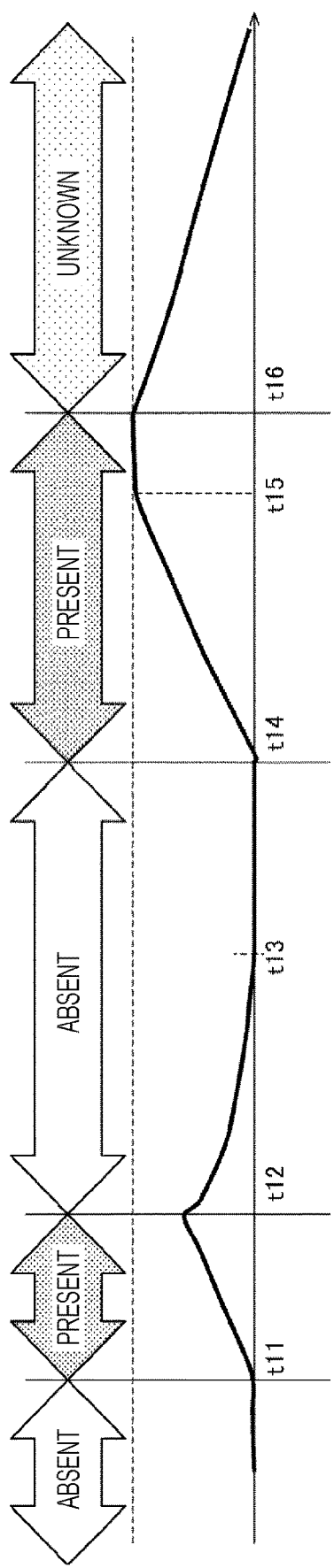
FIG. 11 is a graph illustrating an example of transition of a presence probability in a case where reliability of LiDAR is low.

FIGS. 10 and 11 are graphs illustrating an example of transition of a presence probability of a certain grid on the occupancy grid map. A horizontal axis of the graph represents time, and a vertical axis represents a presence probability.

FIG. 10 illustrates an example in a case where the reliability of the LiDAR 53 is high.

At time t1, as the occupancy state changes from "absent" to "present", the presence probability gradually increases without immediately changing from 0 to 1. Then, at time t2, the presence probability has reached 1.

At time t3, as the occupancy state changes from "present" to "absent", the presence probability gradually decreases without immediately changing from 1 to 0. Then, at time t4, the presence probability has reached 0.

Here, the time from time t3 to time t4 is longer than the time from time t1 to time t2. That is, in a grid of the occupancy grid map, disappearance of the object is reflected later than appearance of the object.

At time t5, as the occupancy state changes from "absent" to "present", the presence probability gradually increases without immediately changing from 0 to 1. Here, an increase rate of the presence probability is substantially equal to an increase rate in a period from time t1 to time t2. Then, at time t6, the presence probability has reached 1.

At time t7, the presence probability gradually decreases as the occupancy state changes from "present" to "unknown". Here, a decrease rate of the presence probability is made smaller than a decrease rate in a period from time t3 to time t4. That is, since it is unclear whether or not an object is present, reflection of disappearance of the object in the grid of the occupancy grid map is delayed.

Whereas, FIG. 11 illustrates an example in a case where the reliability of the LiDAR 53 is low.

At time t11, as the occupancy state changes from "absent" to "present", the presence probability gradually increases without immediately changing from 0 to 1. Here, since the reliability of the LiDAR 53 is low, an increase rate of the presence probability is made smaller than that in the period from the time t1 to the time t2 in FIG. 10.

Then, before the presence probability reaches 1, the occupancy state changes from "present" to "absent" at time t12. Therefore, in a period from time t11 to time t12, depending on a value of a threshold value, there may be a case where the occupancy state remains "absent" without being determined to be "present" at the end.

Thereafter, the presence probability gradually decreases and reaches 0 at time t13.

Here, since the reliability of the LiDAR 53 is low, a decrease rate of the presence probability is smaller than that in the period from time t3 to time t4 in FIG. 10, and a period from time t12 to time t13 is longer than the period from time t3 to time t4.

At time t14, as the occupancy state changes from "absent" to "present", the presence probability gradually increases without immediately changing from 0 to 1. Here, an increase rate of the presence probability is substantially equal to an increase rate in a period from time t11 to time t12. Then, at time t15, the presence probability has reached 1.

At time t16, the presence probability gradually decreases as the occupancy state changes from "present" to "unknown". Here, a decrease rate of the presence probability is substantially equal to that in a period after time t7 in FIG. 10.

Then, the correction unit 314 corrects the occupancy state of each grid on the basis of the presence probability of each grid. For example, among grids whose occupancy state is "present", the correction unit 314 corrects, to "absent", an occupancy state of a grid whose presence probability is less than a predetermined threshold value. For example, among grids whose occupancy state is "absent", the correction unit 314 corrects, to "present", an occupancy state of a grid whose presence probability is equal to or greater than a predetermined threshold value. The occupancy state of the grid whose occupancy state is "unknown" remains unchanged.

Figure 12:
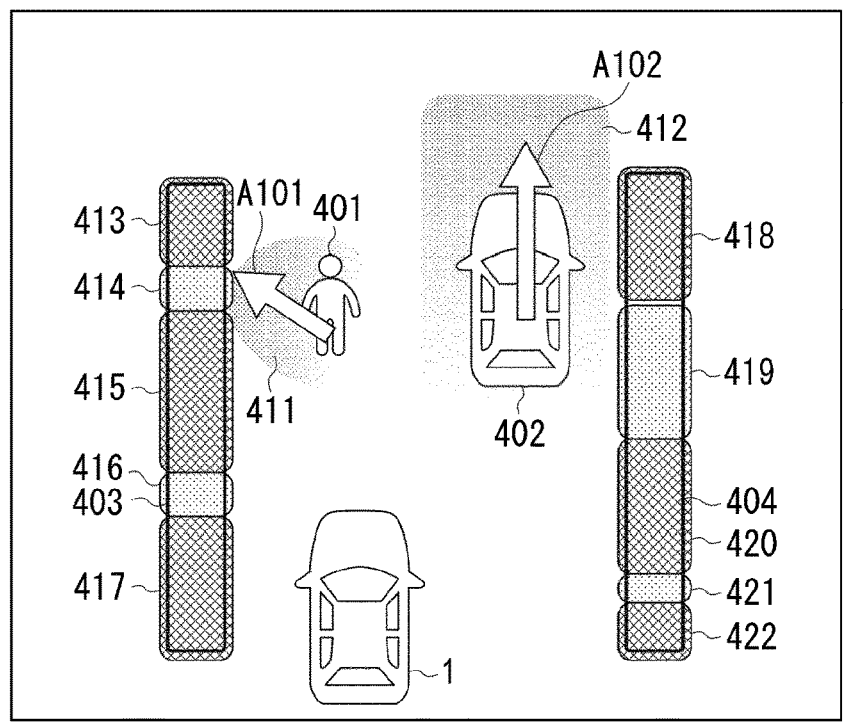
FIG. 12 is a view schematically illustrating an example of the occupancy grid map.

FIG. 12 schematically illustrates an example of the occupancy grid map.

In this example, the vehicle 1 is traveling behind a person 401 and a vehicle 402, between a wall 403 and a wall 404. The person 401 is traveling in a left diagonal front direction as indicated by arrow A101. The vehicle 402 is traveling forward as indicated by arrow A102.

Figure 13:
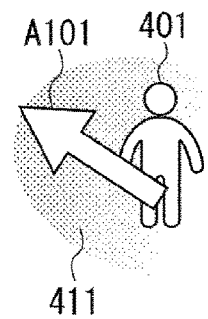
FIG. 13 is a view illustrating an example of an occupied area of a pedestrian.

In this case, as illustrated in FIG. 13, an occupied area 411 for the person 401 expands in the traveling direction of the person 401. Furthermore, the occupied area 411 gradually disappears without expanding, in a direction opposite to the traveling direction of the person 401. Moreover, the occupied area 411 is narrower in a left-right direction perpendicular to the traveling direction than in a front-back direction.

As a result, the vehicle 1 is prevented from traveling into an area where the person 401 travels, and safety of the person 401 is secured. Furthermore, the vehicle 1 can travel into an area after the person 401 passes, and the number of options of the path of the vehicle 1 increases.

Figure 14:
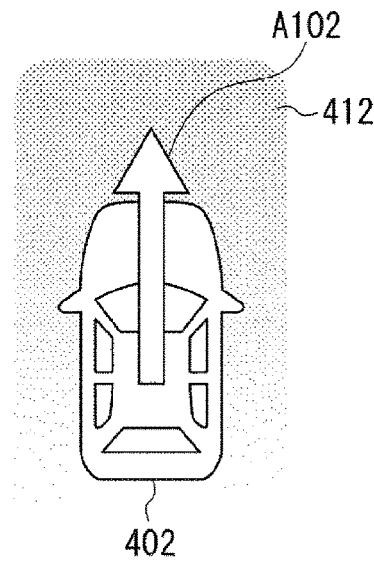
FIG. 14 is a view illustrating an example of an occupied area of a vehicle.

Furthermore, as illustrated in FIG. 14, an occupied area 412 for the vehicle 402 expands in the traveling direction of the vehicle 402. Furthermore, the occupied area 412 gradually disappears without expanding, in a direction opposite to the traveling direction of the vehicle 402. Moreover, the occupied area 412 is narrower in a left-right direction perpendicular to the traveling direction than in a front-back direction.

As a result, the vehicle 1 is prevented from traveling into an area where the vehicle 402 travels, and safety of the vehicle 402 is secured. Furthermore, the vehicle 1 can travel into an area after the vehicle 402 passes, and the number of options of the path of the vehicle 1 increases.

Moreover, the wall 403 is surrounded by occupied areas 413 to 417, and the vehicle 1 is prevented from colliding with the wall 403. Similarly, the wall 404 is surrounded by occupied areas 418 to 422, and the vehicle 1 is prevented from colliding with the wall 404.

Furthermore, since the wall 403 is a stationary object, the occupied areas 413 to 417 are not greatly expanded and have substantially the same size as the wall 403. Therefore, the occupied areas 413 to 417 are prevented from obstructing a path of the vehicle 1. Similarly, since the wall 404 is a stationary object, the occupied areas 418 to 422 are not greatly expanded and have substantially the same size as the wall 404. Therefore, the occupied areas 418 to 422 are prevented from obstructing a path of the vehicle 1.

Moreover, since the occupied areas 413 to 417 are occupied areas for the wall 403 that is a stationary object, an absolute value of the change coefficient of each grid is set to be small. Therefore, for example, even if an area having a small reflectance exists in the wall 403 or noise occurs in a point cloud, the occupied areas 413 to 417 are prevented from disappearing. Therefore, the vehicle 1 is prevented from colliding with the wall 403. Similarly, since the occupied areas 418 to 422 are occupied areas for the wall 404 that is a stationary object, an absolute value of the change coefficient of each grid is set to be small. Therefore, for example, even if an area having a small reflectance exists in the wall 404 or noise occurs in a point cloud, the occupied areas 418 to 422 are prevented from disappearing. Therefore, the vehicle 1 is prevented from colliding with the wall 404.

The correction unit 314 supplies the corrected occupancy grid map to, for example, the action planning unit 62 or the like.

The action planning unit 62 uses any path planning method such as A* to perform the path planning so as to pass through an area where an object is absent in the occupancy grid map.

The operation control unit 63 controls the vehicle 1 so as to pass through the path planned by the action planning unit 62.

Thereafter, the processing returns to step S1, and the processing of steps S1 to S8 is repeatedly executed.

As described above, since the expansion processing and setting processing of the presence probability are performed on the basis of an attribute of each grid of the occupancy grid map, the occupied area is appropriately set for each object. As a result, a path of the vehicle 1 is appropriately set. That is, a shorter path is to be set by avoiding an unnecessary detour while avoiding collision or contact with an obstacle and securing safety.

4. MODIFICATION

Hereinafter, a modification of the above-described embodiment of the present technology will be described.

Modification Related to Correction Method of Occupancy Grid Map

Figure 15:
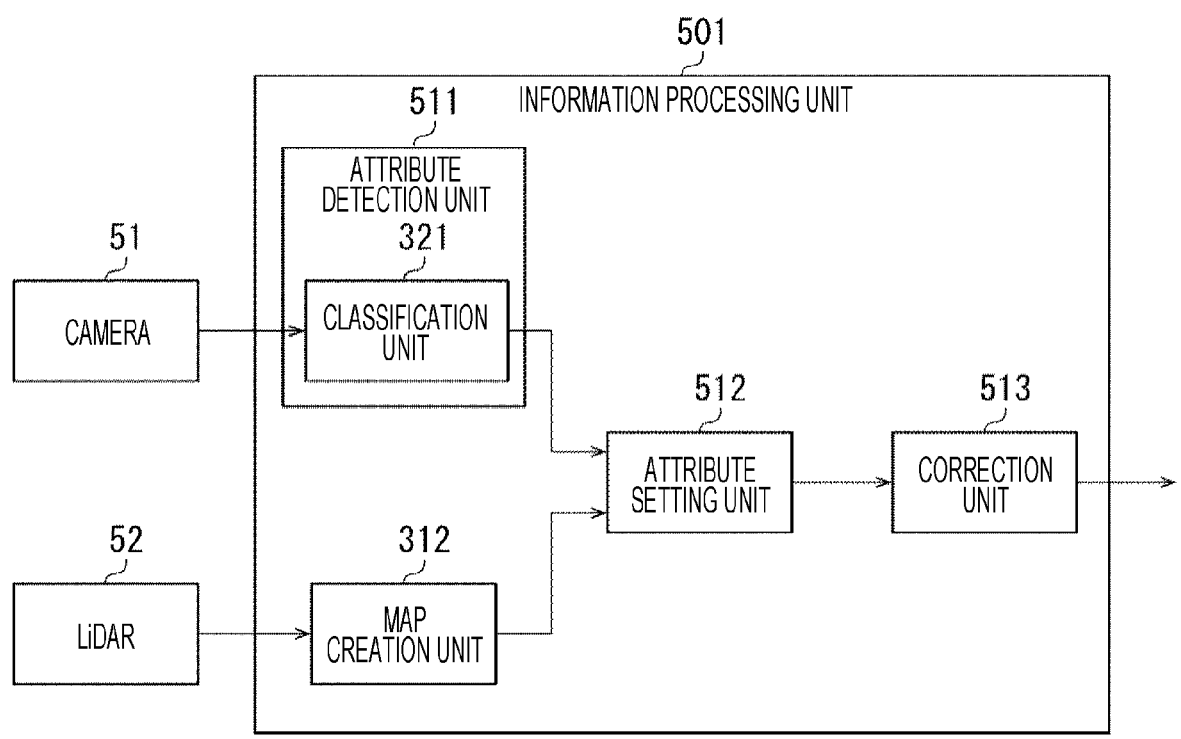
FIG. 15 is a block diagram illustrating a modification of the information processing unit to which the present technology is applied.

FIG. 15 illustrates a modification of the information processing unit. Note that portions corresponding to those of the information processing unit 301 in FIG. 7 are denoted by the same reference numerals, and a description thereof will be omitted as appropriate.

An information processing unit 501 in FIG. 15 is identical to the information processing unit 301 in that a map creation unit 312 is included. Furthermore, the information processing unit 501 is different from the information processing unit 301 in that an attribute detection unit 511, an attribute setting unit 512, and a correction unit 513 are included instead of the attribute detection unit 311, the attribute setting unit 313, and the correction unit 314. The attribute detection unit 511 includes only a classification unit 321.

As described above, the classification unit 321 recognizes a type of an object for each pixel of image data, and supplies a recognition result of the type of the object to the attribute setting unit 512.

The attribute setting unit 512 converts a point cloud or a point of depth in three-dimensional coordinates into image coordinates, and sets an attribute. Then, the attribute setting unit 512 sets whether the object to which the grid belongs is a stationary object or a mobile object and a type of the object, as an attribute of a grid whose occupancy state of an occupancy grid map is "present". The attribute setting unit 512 supplies the occupancy grid map with the attribute to the correction unit 513.

Then, the correction unit 513 performs the expansion processing of the occupancy grid map and the setting processing of the presence probability, on the basis of an attribute of each grid. That is, the correction unit 513 performs the expansion processing of the occupancy grid map and the setting processing of the presence probability without using a movement vector (a traveling direction and a speed) of the object.

Also in this case, an occupied area of each object is to be set more appropriately as compared with a case where the expansion processing and the setting processing of the presence probability are similarly performed on all objects.

For example, as illustrated in FIG. 9 described above, in a case where a traveling direction of the object has not been detected, the expansion amount is similarly set for the entire periphery for a pedestrian and a drone whose direction is easily changed. Furthermore, for a bicycle, a motorcycle, an automobile, and a factory conveyance robot that are difficult to change a direction, the expansion amount for the front where the object is likely to travel is increased, for example, in a case where a direction of an object can be detected. Whereas, in a case where the direction of the object cannot be detected, the expansion amount is similarly set for the entire periphery.

Note that, since an office robot that can easily change a direction is unlikely to suddenly change the direction, the expansion amount is set similarly to a bicycle, a motorcycle, an automobile, and a factory conveyance robot that are difficult to change the direction.

Note that, further, the type of the object may be classified into only a mobile object or a stationary object, and only whether a mobile object or a stationary object may be set as the attribute of each grid. Also in this case, an occupied area of each object is to be set more appropriately as compared with a case where the expansion processing and the setting processing of the presence probability are similarly performed on all objects.

Furthermore, for example, an expansion direction and an expansion amount may be set on the basis of only a traveling direction without using a speed of the mobile object.

Moreover, for example, the expansion processing and the setting processing of the presence probability may be performed on a mobile object that is standing still, by using an expansion amount and a change coefficient similar to those of a stationary object or an expansion amount and a change coefficient close to those of a stationary object.

In this case, for example, a threshold value of a speed to be used for determining whether or not the object is standing still may be set to a different value for each type of object. For example, whether or not a vehicle and a pedestrian are standing still may be determined on the basis of threshold values of different speeds.

Furthermore, for example, determination may be made as to whether or not the object is standing still on the basis of a state of the object. For example, a bicycle on which no person rides may be determined as a stationary object. However, a bicycle that is standing still but has a person riding is likely to move, and thus may be determined as a mobile object or an object close to a stationary object (hereinafter, a quasi-stationary object). For example, a vehicle on which a driver is not riding may be determined as a stationary object, and a vehicle on which a driver is riding may be determined as a mobile object or a quasi-stationary object.

Furthermore, in a case where a vehicle is standing still or slowly traveling, a door may be opened. Therefore, for example, in a case where a speed of the vehicle is less than a predetermined threshold value, an expansion amount of an occupied area in a left-right direction with respect to the vehicle may be increased.

Figure 16:
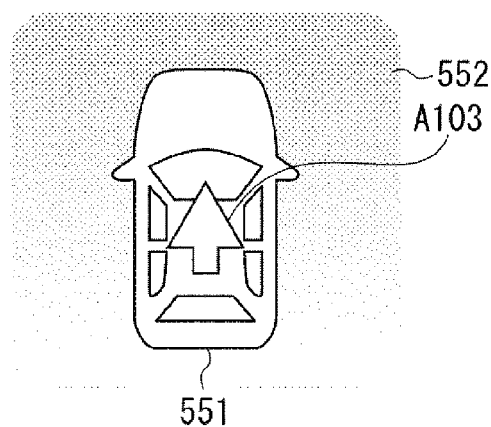
FIG. 16 is a view illustrating a modification of the occupied area of the vehicle.

For example, as illustrated in FIG. 16, in a case where a speed of a vehicle 551 in a direction of arrow A103 (a forward direction) is less than a predetermined threshold value, an expansion amount of an occupied area 552 in a left-right direction may be increased. As a result, for example, the vehicle 1 sets a path that can avoid collision or contact with the vehicle 551 even if a door of the vehicle 551 is opened.

Furthermore, for example, a gradual increase speed and a gradual decrease speed of a presence probability of a grid in which a mobile object whose safety is secured even when collision occurs may be set to the maximum. As a result, appearance and disappearance of the mobile object in each grid are to be quickly reflected.

Moreover, for example, a change coefficient for a mobile object may be adjusted on the basis of a speed of the vehicle 1. For example, in a case where the vehicle 1 is traveling at a high speed equal to or higher than a predetermined speed on a highway or the like, a gradual increase speed and a gradual decrease speed of a presence probability of a grid in which a mobile object is present may be set to the maximum. As a result, appearance and disappearance of a mobile object in each grid are to be quickly reflected.

Furthermore, for example, a presence probability of a grid whose occupancy state has changed from "present" to "absent" may be immediately set to 0, and only a presence probability of a grid whose occupancy state has changed from "present" to "unknown" may be gradually decreased.

Moreover, in the above description, an example has been described in which an object moves in a horizontal direction. However, even in a case where the object moves in a direction other than the horizontal direction (for example, in a vertical direction), the expansion processing is performed on the basis of the traveling direction of the object, similarly to the example described above.

Modification Related to Correction Method of Occupancy Grid Map

For example, a method other than the above-described instance segmentation may be used for recognition processing of a type of an object. For example, it is possible to use a method such as semantic segmentation, you only look once (YOLO), or single shot multibox detector (SSD).

Note that, for example, a mobile object can be detected using an optical flow, but in this case, a mobile object that is standing still cannot be detected.

Furthermore, a point cloud may be created using a sensor other than the LiDAR. For example, a point cloud may be created by a radar, a depth camera (for example, a stereo camera or a ToF camera), or the like. Furthermore, a point cloud may be created on the basis of a plurality of pieces of image data captured by a monocular camera in different orientations.

Moreover, for example, the occupancy grid map may be created on the basis of a three-dimensional model other than the point cloud.

Furthermore, for example, movement estimation of an object may be performed on the basis of image data.

Moreover, the present technology can also be applied to a two-dimensional occupancy grid map. In this case, for example, a recognition result of an object of image data is projection-converted into a two-dimensional bird's-eye view, and is associated with each object.

Furthermore, for example, an upper limit value of a moving speed of an object may be provided on the basis of a type of the object. As a result, erroneous detection of the moving speed can be prevented.

Moreover, for example, a sensor such as the camera 51 may perform the recognition processing of a type of an object and supply a recognition result of the type of the object to the information processing unit 301 or the information processing unit 501.

Furthermore, the present technology can also be applied to a case where an occupancy grid map is created in a mobile device other than a vehicle, for example, a drone, a robot, or the like.

5. OTHER

Computer Configuration Example

The series of processes described above can be executed by hardware or also executed by software. When the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 17:
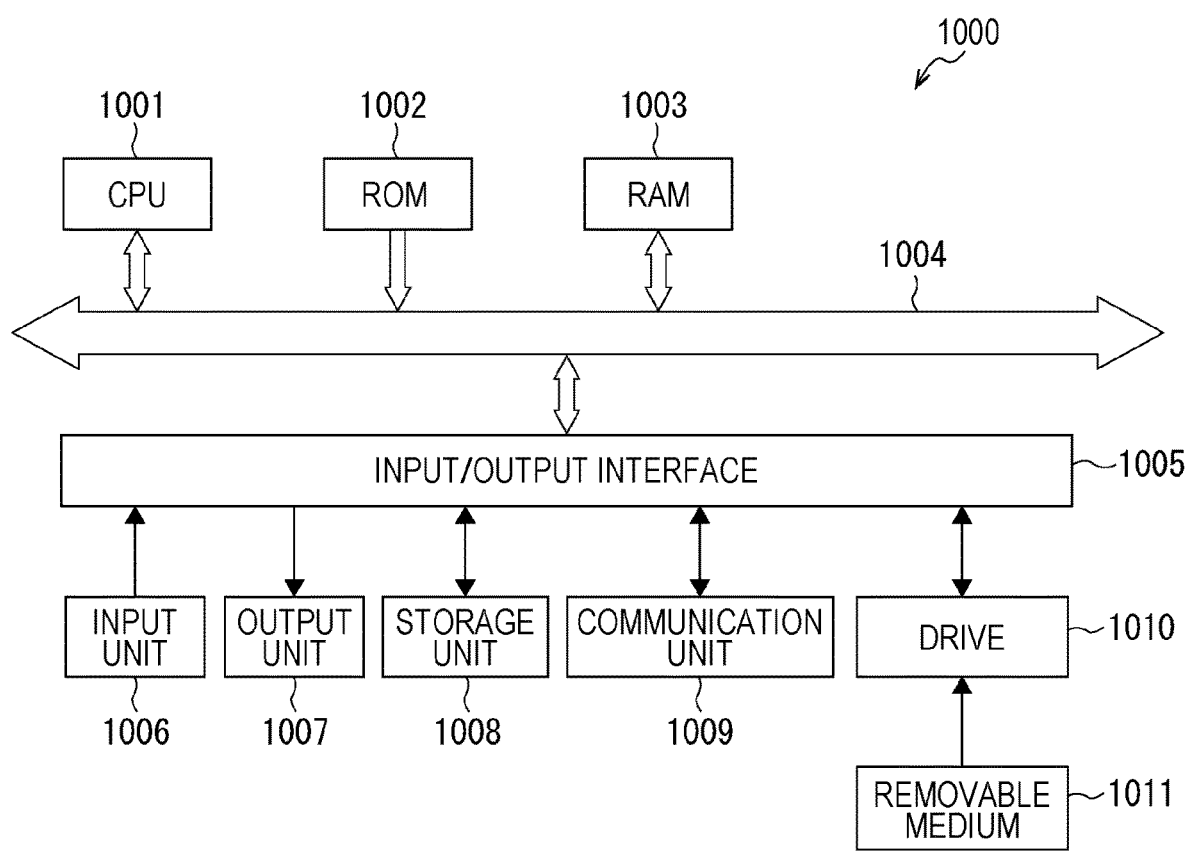
FIG. 17 is a block diagram illustrating a configuration example of a computer.

FIG. 17 is a block diagram illustrating a configuration example of hardware of a computer that executes the series of processes described above in accordance with a program.

In a computer 1000, a central processing unit (CPU) 1001, a read only memory (ROM) 1002, and a random access memory (RAM) 1003 are mutually connected by a bus 1004.

The bus 1004 is further connected with an input/output interface 1005. To the input/output interface 1005, an input unit 1006, an output unit 1007, a recording unit 1008, a communication unit 1009, and a drive 1010 are connected.

The input unit 1006 includes an input switch, a button, a microphone, an image sensor, and the like. The output unit 1007 includes a display, a speaker, and the like. The recording unit 1008 includes a hard disk, a non-volatile memory, and the like. The communication unit 1009 includes a network interface or the like. The drive 1010 drives a removable medium 1011 such as a magnetic disk, an optical disk, a magneto-optical disk, or a semiconductor memory.

In the computer 1000 configured as described above, the series of processes described above are performed, for example, by the CPU 1001 loading a program recorded in the recording unit 1008 into the RAM 1003 via the input/output interface 1005 and the bus 1004, and executing.

The program executed by the computer 1000 (the CPU 1001) can be provided by being recorded on, for example, the removable medium 1011 as a package medium or the like. Furthermore, the program can be provided via a wired or wireless transmission medium such as a local area network, the Internet, or digital satellite broadcasting.

In the computer 1000, by attaching the removable medium 1011 to the drive 1010, the program can be installed in the recording unit 1008 via the input/output interface 1005. Furthermore, the program can be received by the communication unit 1009 via a wired or wireless transmission medium, and installed in the recording unit 1008. Besides, the program can be installed in advance in the ROM 1002 and the recording unit 1008.

Note that the program executed by the computer may be a program that performs processing in a time series according to an order described in this specification, or may be a program that performs processing in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Moreover, the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Combination Example of Configuration

The present technology can also have the following configurations.

(1)

A signal processing device including:

a map creation unit configured to create an occupancy grid map indicating a presence or absence of an object in a unit of a grid on the basis of first sensor data from a first sensor used to detect the object in surroundings of a mobile device;

an attribute setting unit configured to set an attribute of the grid of the occupancy grid map on the basis of an attribute of the object; and a correction unit configured to correct the occupancy grid map on the basis of an attribute of the grid.

(2)

The signal processing device according to (1) described above, in which the correction unit sets an expansion amount of an occupied area of the object on the occupancy grid map on the basis of an attribute of the grid, and performs expansion processing of the occupied area on the basis of the expansion amount.

(3)

The signal processing device according to (2) described above, in which an attribute of the grid includes a type of the object in the grid, and the correction unit sets the expansion amount on the basis of a type of the object.

(4)

The signal processing device according to (3) described above, in which a type of the object includes a mobile object and a stationary object, and the correction unit sets an expansion amount for a mobile object to be larger than an expansion amount for a stationary object.

(5)

The signal processing device according to any one of (2) to (4) described above, in which an attribute of the grid includes a traveling direction of the object in the grid, and the correction unit sets the expansion amount and an expansion direction of the occupied area on the basis of a traveling direction of the object.

(6)

The signal processing device according to (5) described above, in which an attribute of the grid further includes a speed of the object in the grid, and the correction unit sets the expansion amount, further on the basis of a speed of the object.

(7)

The signal processing device according to (2) described above, in which an attribute of the grid includes a direction of the object in the grid, and the correction unit sets the expansion amount and an expansion direction of the occupied area on the basis of a direction of the object.

(8)

The signal processing device according to any one of (1) to (7) described above, in which the correction unit sets a presence probability of the object in the grid on the basis of an occupancy state indicating a presence or absence of the object in the grid and on the basis of an attribute of the grid.

(9)

The signal processing device according to (8) described above, in which an attribute of the grid includes a type of the object in the grid, and the correction unit sets a speed at which the presence probability of the grid is increased or decreased of the grid on the basis of a type of the object in the grid.

(10)

The signal processing device according to (9) described above, in which a type of the object includes a mobile object and a stationary object, and in a case where the occupancy state of the grid has changed from present to absent, when the object in the grid is a mobile object, the correction unit increases a speed at which the presence probability of the grid is decreased as compared with a case where the object in the grid is a stationary object.

(11)
The signal processing device according to any one of (8) to (10) described above, in which
in a case where the occupancy state of the grid has changed from present to unknown, the correction unit reduces a speed at which the presence probability of the grid is decreased as compared with a case where the occupancy state has changed from present to absent.

(12)
The signal processing device according to any one of (8) to (11) described above, in which
the correction unit sets a speed at which the presence probability of the grid is increased or decreased on the basis of reliability of the first sensor.

(13)
The signal processing device according to any one of (8) to (12) described above, in which
the correction unit corrects the occupancy state on the basis of the presence probability of the grid.

(14)
The signal processing device according to any one of (1) to (13) described above, further including:
an attribute detection unit configured to detect an attribute of the object on the basis of second sensor data from a second sensor.

(15)
The signal processing device according to (14) described above, in which
the attribute detection unit detects a type of the object as an attribute of the object on the basis of the second sensor data.

(16)
The signal processing device according to (14) or (15) described above, in which
the attribute detection unit detects a traveling direction and a speed of the object as attributes of the object on the basis of the first sensor data and the second sensor data.

(17)
The signal processing device according to any one of (14) to (16) described above, in which
the second sensor is a sensor used to acquire information indicating an attribute of the object.

(18)
A signal processing method including:
creating an occupancy grid map indicating a presence or absence of an object in a unit of a grid on the basis of sensor data from a sensor used to detect the object in surroundings of a mobile device;
setting an attribute of the grid of the occupancy grid map on the basis of an attribute of the object; and
correcting the occupancy grid map on the basis of an attribute of the grid.

(19)
A program for causing a computer to execute processing of:
creating an occupancy grid map indicating a presence or absence of an object in a unit of a grid on the basis of sensor data from a sensor used to detect the object in surroundings of a mobile device;
setting an attribute of the grid of the occupancy grid map on the basis of an attribute of the object; and
correcting the occupancy grid map on the basis of an attribute of the grid.

(20)
A mobile device including:
a map creation unit configured to create an occupancy grid map indicating a presence or absence of an object in a unit of a grid on the basis of sensor data from a sensor used to detect the object in surroundings;
an attribute setting unit configured to set an attribute of the grid of the occupancy grid map on the basis of an attribute of the object;
a correction unit configured to correct the occupancy grid map on the basis of an attribute of the grid; and
an action planning unit configured to set a path on the basis of the corrected occupancy grid map.

Note that the effects described in this specification are merely examples and are not limited, and other effects may be present.

REFERENCE SIGNS LIST

1 Vehicle
11 Vehicle control system
51 Camera
53 LiDAR
73 Recognition unit
62 Action planning unit
301 Information processing unit
311 Attribute setting unit
312 Map creation unit
313 Attribute setting unit
314 Correction unit
321 Classification unit
322 Object detection unit
323 Movement estimation unit
501 Information processing unit
511 Attribute detection unit
512 Attribute setting unit
513 Correction unit

The invention claimed is:
1. A signal processing device, comprising:
a central processing unit (CPU) configured to:
create an occupancy grid map to set a path for movement of a mobile device, wherein
the occupancy grid map indicates a presence or absence of an object in a unit of a grid of the occupancy grid map, based on first sensor data from a first sensor, and
the first sensor detects the object in surroundings of the mobile device;
set an attribute of the grid of the occupancy grid map, based on an attribute of the object, wherein
the attribute of the grid includes a type of the object in the grid, and
the type of the object indicates the object as a mobile object or a stationary object;
correct the occupancy grid map based on the attribute of the grid to:
set, based on each of an occupancy state indicating the presence or absence of the object in the grid and the attribute of the grid, a presence probability of the grid in the occupancy grid map, and
set a rate at which the presence probability of the grid gradually increases or gradually decreases, wherein
the rate at which the presence probability of the grid gradually increases or gradually decreases is set based on:

the type of the object in the grid,
a change in the occupancy state of the object in the grid, and
a reliability of the first sensor;
set the path of the mobile device based on the corrected occupancy grid map; and
control an action of the mobile device, based on the set path and the corrected occupancy grid map.

2. The signal processing device according to claim 1, wherein the CPU is further configured to:
set an expansion amount of an occupied area of the object on the occupancy grid map, based on the attribute of the grid, and
execute expansion processing of the occupied area based on the expansion amount.

3. The signal processing device according to claim 2, wherein
the CPU is further configured to set the expansion amount based on the type of the object.

4. The signal processing device according to claim 3, wherein
the CPU is further configured—to set the expansion amount for the mobile object larger than the expansion amount for the stationary object.

5. The signal processing device according to claim 2, wherein
the attribute of the grid further includes a traveling direction of the object in the grid, and
the CPU is further configured to set the expansion amount and an expansion direction of the occupied area, based on the traveling direction of the object.

6. The signal processing device according to claim 5, wherein
the attribute of the grid further includes a speed of the object in the grid, and
the CPU is further configured to set the expansion amount, further based on the speed of the object.

7. The signal processing device according to claim 2, wherein
the attribute of the grid includes a direction of the object in the grid, and
the CPU is further configured to set the expansion amount and an expansion direction of the occupied area, based on the direction of the object.

8. The signal processing device according to claim 1, wherein
in a case where the occupancy state of the grid changes from present to absent and the object in the grid is the mobile object, the CPU is further configured to increase the rate at which the presence probability of the grid is gradually decreased as compared with a case where the object in the grid is the stationary object.

9. The signal processing device according to claim 1, wherein
in a case where the occupancy state of the grid changes from present to unknown, the CPU is further configured to reduce the rate at which the presence probability of the grid is decreased as compared with a case where the occupancy state changes from present to absent.

10. The signal processing device according to claim 1, wherein
the CPU is further configured to correct the occupancy state based on the presence probability of the grid.

11. The signal processing device according to claim 1, wherein
the CPU is further configured to detect the attribute of the object based on second sensor data from a second sensor.

12. The signal processing device according to claim 11, wherein
the CPU is further configured to detect the type of the object as the attribute of the object, based on the second sensor data.

13. The signal processing device according to claim 11, wherein
the CPU is further configured to detect a speed and a traveling direction of the object as attributes of the object, based on the first sensor data and the second sensor data.

14. The signal processing device according to claim 11, wherein
the second sensor is a sensor that acquires information indicating the attribute of the object.

15. The signal processing device according to claim 1, wherein
the reliability of the first sensor is one of a first value or a second value lower than the first value,
in a case where the reliability of the first sensor is the first value, the CPU is further configured to increase the rate at which the presence probability of the grid is gradually increased or gradually decreased, and
in a case where the reliability of the first sensor is the second value, the CPU is configured to reduce the rate at which the presence probability of the grid is gradually increased or gradually decreased.

16. A signal processing method, comprising:
creating an occupancy grid map to set a path for movement of a mobile device, wherein
the occupancy grid map indicates a presence or absence of an object in a unit of a grid of the occupancy grid map, based on sensor data from a sensor, and
the sensor detects the object in surroundings of the mobile device;
setting an attribute of the grid of the occupancy grid map, based on an attribute of the object, wherein
the attribute of the grid includes a type of the object in the grid, and
the type of the object indicates the object as a mobile object or a stationary object;
correcting the occupancy grid map based on the attribute of the grid to:
setting, based on each of an occupancy state indicating the presence or absence of the object in the grid and the attribute of the grid, a presence probability of the grid in the occupancy grid map, and
setting a rate at which the presence probability of the grid gradually increases or gradually decreases, wherein
the rate at which the presence probability of the grid gradually increases or gradually decreases is set based on:
the type of the object in the grid,
a change in the occupancy state of the object in the grid, and
a reliability of the sensor;
setting the path of the mobile device based on the corrected occupancy grid map; and
controlling an action of the mobile device, based on the set path and the corrected occupancy grid map.

17. A non-transitory computer-readable medium having stored thereon, computer-executable instructions which, when executed by a computer, cause the computer to execute operations, the operations comprising:

creating an occupancy grid map to set a path for movement of a mobile device, wherein
        the occupancy grid map indicates a presence or absence of an object in a unit of a grid of the occupancy grid map, based on sensor data from a sensor, and
        the sensor detects the object in surroundings of the mobile device;
    setting an attribute of the grid of the occupancy grid map, based on an attribute of the object, wherein
        the attribute of the grid includes a type of the object in the grid, and
        the type of the object indicates the object as a mobile object or a stationary object;
    correcting the occupancy grid map based on the attribute of the grid to:
        setting, based on each of an occupancy state indicating the presence or absence of the object in the grid and the attribute of the grid, a presence probability of the grid in the occupancy grid map, and
        setting a rate at which the presence probability of the grid gradually increases or gradually decreases, wherein
            the rate at which the presence probability of the grid gradually increases or gradually decreases is set based on:
            the type of the object in the grid,
            a change in the occupancy state of the object in the grid, and
            a reliability of the sensor;
    setting the path of the mobile device based on the corrected occupancy grid map; and
    controlling an action of the mobile device, based on the set path and the corrected occupancy grid map.

18. A mobile device, comprising:
a central processing unit (CPU) configured to:
    create an occupancy grid map indicating a presence or absence of an object in a unit of a grid of the occupancy grid map, based on sensor data from a sensor, wherein the sensor detects the object in surroundings;
    set an attribute of the grid of the occupancy grid map, based on an attribute of the object, wherein
        the attribute of the grid includes a type of the object in the grid, and
        the type of the object indicates the object as a mobile object or a stationary object;
    correct the occupancy grid map based on the attribute of the grid to:
        set, based on each of an occupancy state indicating the presence or absence of the object in the grid and the attribute of the grid, a presence probability of the grid in the occupancy grid map,
        set a rate at which the presence probability of the grid gradually increases or gradually decreases, wherein the rate at which the presence probability of the grid gradually increases or gradually decreases is set based on:
        the type of the object in the grid,
        a change in the occupancy state of the object in the grid, and
        a reliability of the sensor;
    set a path of the mobile device based on the corrected occupancy grid map; and
    control an action of the mobile device, based on the set path and the corrected occupancy grid map.

\* \* \* \* \*